(12) United States Patent
Lahnala et al.

(10) Patent No.: US 10,155,432 B2
(45) Date of Patent: Dec. 18, 2018

(54) SLIDING WINDOW ASSEMBLY

(71) Applicant: AGC AUTOMOTIVE AMERICAS CO., Alpharetta, GA (US)

(72) Inventors: David W. Lahnala, Adrian, MI (US); Daniel Bennett, Tecumseh, MI (US)

(73) Assignee: AGC AUTOMOTIVE AMERICAS CO., Alpharetta, GA (US)

( * ) Notice: Subject to any disclaimer, the term of this patent is extended or adjusted under 35 U.S.C. 154(b) by 569 days.

(21) Appl. No.: 14/755,677

(22) Filed: Jun. 30, 2015

(65) Prior Publication Data

US 2015/0298528 A1 Oct. 22, 2015

Related U.S. Application Data

(63) Continuation-in-part of application No. 12/944,444, filed on Nov. 11, 2010, which is a
(Continued)

(51) Int. Cl.
*H05B 1/02* (2006.01)
*B60J 1/18* (2006.01)
(Continued)

(52) U.S. Cl.
CPC ........... *B60J 1/1853* (2013.01); *E05F 15/632* (2015.01); *H05B 3/06* (2013.01); *H05B 3/84* (2013.01);
(Continued)

(58) Field of Classification Search
CPC ... B60J 1/1853; E05F 15/632; E05Y 2201/43; H05B 3/06; H05B 2203/005; H05B 2203/011; H05B 2203/014
(Continued)

(56) References Cited

U.S. PATENT DOCUMENTS 3,544,737 A  12/1970 Nowak
4,388,522 A   6/1983 Boaz
(Continued)

FOREIGN PATENT DOCUMENTS

| DE | 199 30 541 A1 | 1/2011 |
| FR | 2 932 736 A1 | 12/2009 |
| WO | WO 03/024156 A2 | 3/2003 |

OTHER PUBLICATIONS

International Search Report for Application No. PCT/US2011/060455 dated Feb. 10, 2012, 4 pages.
(Continued)

*Primary Examiner* — Mark Paschall
(74) *Attorney, Agent, or Firm* — Howard & Howard Attorneys PLLC

(57) ABSTRACT

A sliding window assembly for a vehicle, a cable drive system for a vehicle, and methods of operating the same, are disclosed. The sliding window assembly includes a track adapted to be coupled to the vehicle, and a sliding panel movable relative to the track between an open position and a closed position. A heating element is coupled to the sliding panel for heating the sliding panel. The sliding window assembly further includes a conductive cable coupled to the sliding panel and the heating element. The conductive cable is configured to transfer electrical current to energize the heating element and to undergo mechanical force to move the sliding panel relative to the track between the open and closed positions.

24 Claims, 18 Drawing Sheets

Related U.S. Application Data continuation-in-part of application No. 12/906,440, filed on Oct. 18, 2010, now abandoned, application No. 14/755,677, filed on Jun. 30, 2015, which is a continuation-in-part of application No. 12/944,448, filed on Nov. 11, 2010, which is a continuation-in-part of application No. 12/906,444, filed on Oct. 18, 2010, now abandoned.

(51) Int. Cl.
*E05F 15/632* (2015.01)
*H05B 3/84* (2006.01)
*H05B 3/06* (2006.01)

(52) U.S. Cl.
CPC ....... *E05Y 2201/43* (2013.01); *E05Y 2800/20* (2013.01); *H05B 2203/005* (2013.01); *H05B 2203/011* (2013.01); *H05B 2203/014* (2013.01)

(58) Field of Classification Search
USPC .................................. 219/202, 203, 494
See application file for complete search history.

(56) References Cited

U.S. PATENT DOCUMENTS

| | | | |
|---|---|---|---|
| 4,496,627 | A | 1/1985 | Azuma et al. |
| 4,920,698 | A | 5/1990 | Friese et al. |
| 5,542,214 | A | 8/1996 | Buening |
| 5,613,323 | A | 3/1997 | Buening |
| 5,716,536 | A | 2/1998 | Yokoto et al. |
| 5,724,771 | A | 3/1998 | Gipson |
| 6,014,840 | A | 1/2000 | Ray et al. |
| 6,071,453 | A | 6/2000 | Church |
| 6,204,480 | B1 | 3/2001 | Woodard et al. |
| 6,255,624 | B1 | 7/2001 | Boaz et al. |
| 6,382,697 | B1 | 5/2002 | Mulder et al. |
| 6,598,931 | B2 | 7/2003 | Tamura |
| 6,766,617 | B2 * | 7/2004 | Purcell ................... B60J 1/1853 49/360 |
| 7,568,312 | B2 | 8/2009 | Dufour et al. |
| 2003/0110702 | A1 | 6/2003 | Capriotti et al. |
| 2003/0182866 | A1 | 10/2003 | Nestell et al. |
| 2004/0025439 | A1 | 2/2004 | Purcell |
| 2006/0059781 | A1 | 3/2006 | Berklich, Jr. et al. |
| 2006/0064934 | A1 | 3/2006 | Vornbaumen et al. |
| 2006/0107599 | A1 | 5/2006 | Luten |
| 2006/0174544 | A1 | 8/2006 | Dufour et al. |
| 2008/0268672 | A1 | 10/2008 | Sargent et al. |
| 2010/0122495 | A1 | 5/2010 | Lahnala |
| 2010/0122496 | A1 | 5/2010 | Lahnala |
| 2010/0146859 | A1 | 6/2010 | Gipson et al. |
| 2010/0154312 | A1 | 6/2010 | Gipson et al. |
| 2011/0030276 | A1 * | 2/2011 | Smith ................... B60J 1/1853 49/70 |
| 2011/0147153 | A1 * | 6/2011 | Rutkowski ............. B60S 1/026 191/12.2 R |
| 2011/0181071 | A1 | 7/2011 | Schaff et al. |
| 2012/0091113 | A1 | 4/2012 | Bennett et al. |
| 2012/0091114 | A1 | 4/2012 | Ackerman et al. |
| 2012/0291353 | A1 | 11/2012 | Gipson et al. |
| 2017/0238371 | A1 | 8/2017 | Lahnala et al. |

OTHER PUBLICATIONS

International Search Report for Application No. PCT/US2011/060446 dated Feb. 17, 2012, 4 pages.

International Search Report for Application No. PCT/US2012/022973 dated Apr. 3, 2012, 3 pages.

Chomerics, "Low-Closure Force, Foam Core EMI Gaskets, Soft-Shield 4000 Series", extracted in Apr. 2013 from website: http://www.chomerics.com, pp. 1-3.

Pres-On, "Technical Data Sheet—Pres-On P9100/P9200 Tape", extracted in Apr. 2013 from website: http://www.pres-son.com, 2 pages.

English language abstract and machine-assisted English translation for DE 199 30 541 extracted from espacenet.com database on Sep. 3, 2015, 18 pages.

English language abstract and machine-assisted English translation for FR 2 932 736 extracted from espacenet.com database on Jan. 3, 2014, 12 pages.

International Search Report for Application No. PCT/US2015/052923 dated Jan. 19, 2016, 4 pages.

* cited by examiner

SLIDING WINDOW ASSEMBLY

CROSS REFERENCE TO RELATED APPLICATIONS

This application is a continuation-in-part of U.S. Non-Provisional patent application Ser. No. 12/944,444 filed on Nov. 11, 2010, which is a continuation-in-part of U.S. Non-Provisional patent application Ser. No. 12/906,440 filed on Oct. 18, 2010, now abandoned, the disclosures of each being hereby incorporated by reference in their entirety.

This application is also a continuation-in-part of U.S. Non-Provisional patent application Ser. No. 12/944,448 filed on Nov. 11, 2010, which is a continuation-in-part of U.S. Non-Provisional patent application Ser. No. 12/906,444 filed on Oct. 18, 2010, now abandoned, the disclosures of each being hereby incorporated by reference in their entirety.

BACKGROUND OF THE INVENTION

1. Field of the Invention

The subject invention generally relates to a sliding window assembly and a cable drive system and for a vehicle.

2. Description of the Related Art

Window assemblies for vehicles are known in the art. One type of window assembly includes a first panel and a second panel each fixed to the vehicle. The first and second panels are spaced from each other to define an opening therebetween. A sliding panel is disposed between the first and second panels and is movable relative to the first and second panels between an open position and a closed position to selectively cover the opening. A heating grid is conventionally coupled to the sliding panel for defrosting or defogging the respective sliding panel. As such, electrical wiring or electrical components are necessary to energize the heating grid.

The sliding panel can be opened and closed manually or automatically. When the sliding panel moves automatically, a motor is typically utilized to move the sliding panel between the open and closed positions. More specifically, a cable is mechanically coupled to the motor and the sliding panel for moving the sliding panel between the open and closed positions in response to motor movement.

In such conventional configurations, electrical wiring that is entirely separate or independent from the cable is needed to energize the heating grid. In other words, electrical current that passes to the heating grid must flow through electrical wiring that is independent of the cable that mechanically moves the sliding panel. Such separate electrical wiring requires additional wiring and components thereby increasing cost to the assembly and system. Moreover, such separate electrical wiring and components reduce valuable packaging space within the vehicle.

SUMMARY OF THE INVENTION AND ADVANTAGES

One embodiment of a sliding window assembly is provided. The sliding window assembly includes a track adapted to be coupled to the vehicle. The sliding window assembly further includes a sliding panel movable relative to the track between an open position and a closed position. A heating element is coupled to the sliding panel for heating the sliding panel. The sliding window assembly also includes a conductive cable coupled to the sliding panel and the heating element. The conductive cable is configured to transfer electrical current to energize the heating element and to undergo mechanical force to move the sliding panel relative to the track between the open and closed positions.

One embodiment of a cable drive system for a sliding panel is provided. A heating element for heating the sliding panel is provided. The cable drive system includes a motor assembly and a conductive cable electrically and mechanically coupled to the motor assembly. The motor assembly is configured to provide electrical current to the conductive cable to energize the heating element for heating the sliding panel. The motor assembly is also configured to apply mechanical force to the conductive cable for moving the sliding panel between an open position and a closed position.

One embodiment of a method of operating a sliding window assembly of a vehicle is provided. The sliding window assembly includes a track adapted to be coupled to the vehicle. A sliding panel is movable relative to the track between an open position and a closed position. A heating element is coupled to the sliding panel for heating the sliding panel. A conductive cable is mechanically coupled to the sliding panel and electrically coupled to the heating element. The method comprises transferring electrical current through the conductive cable to energize the heating element for heating the sliding panel. The method comprises applying mechanical force to the conductive cable to move the sliding panel between the open and closed positions.

The sliding window assembly and the cable drive system advantageously provide the conductive cable, which not only mechanically moves the sliding window between the open and closed position, but also transfers electrical current to the heating element of the sliding window. Thus, the conductive cable serves a dual electro-mechanical purpose allowing elimination of separate and independent electrical wiring for energizing the heating element. Furthermore, the sliding window assembly and the cable drive system eliminate a need to have separate and independent devices to open and close the sliding panel and to energize the heating element. Moreover, the sliding window assembly and cable drive system provide increased robustness, packaging space savings, and component reduction.

BRIEF DESCRIPTION OF THE DRAWINGS

Advantages of the subject invention will be readily appreciated, as the same becomes better understood by reference to the following detailed description, when considered in connection with the accompanying drawings.

DETAILED DESCRIPTION OF THE INVENTION

Figure 1:
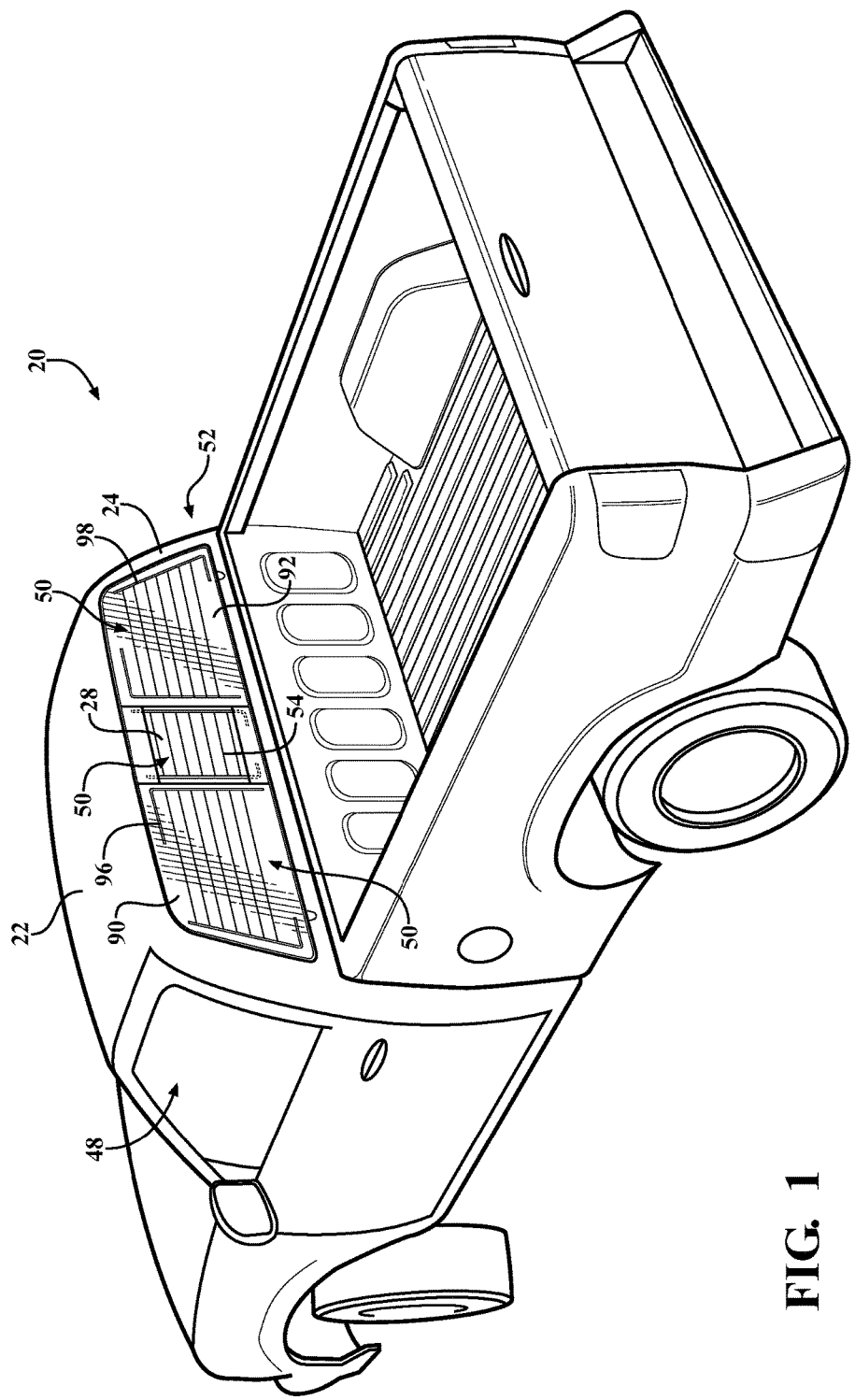
FIG. 1 is a perspective view of a sliding window assembly installed on a vehicle with a sliding panel in a closed position.

Referring to the Figures, wherein like numerals indicate like or corresponding parts throughout the several views, a sliding window assembly 20 for a vehicle 22 is generally shown. Typically, as shown in FIG. 1, the sliding window assembly 20 is coupled to a rear window body 24 of a pickup truck 22. However, it is to be appreciated that the sliding window assembly 20 can be coupled to any suitable location of other types of vehicles or non-vehicles.

Figure 2:
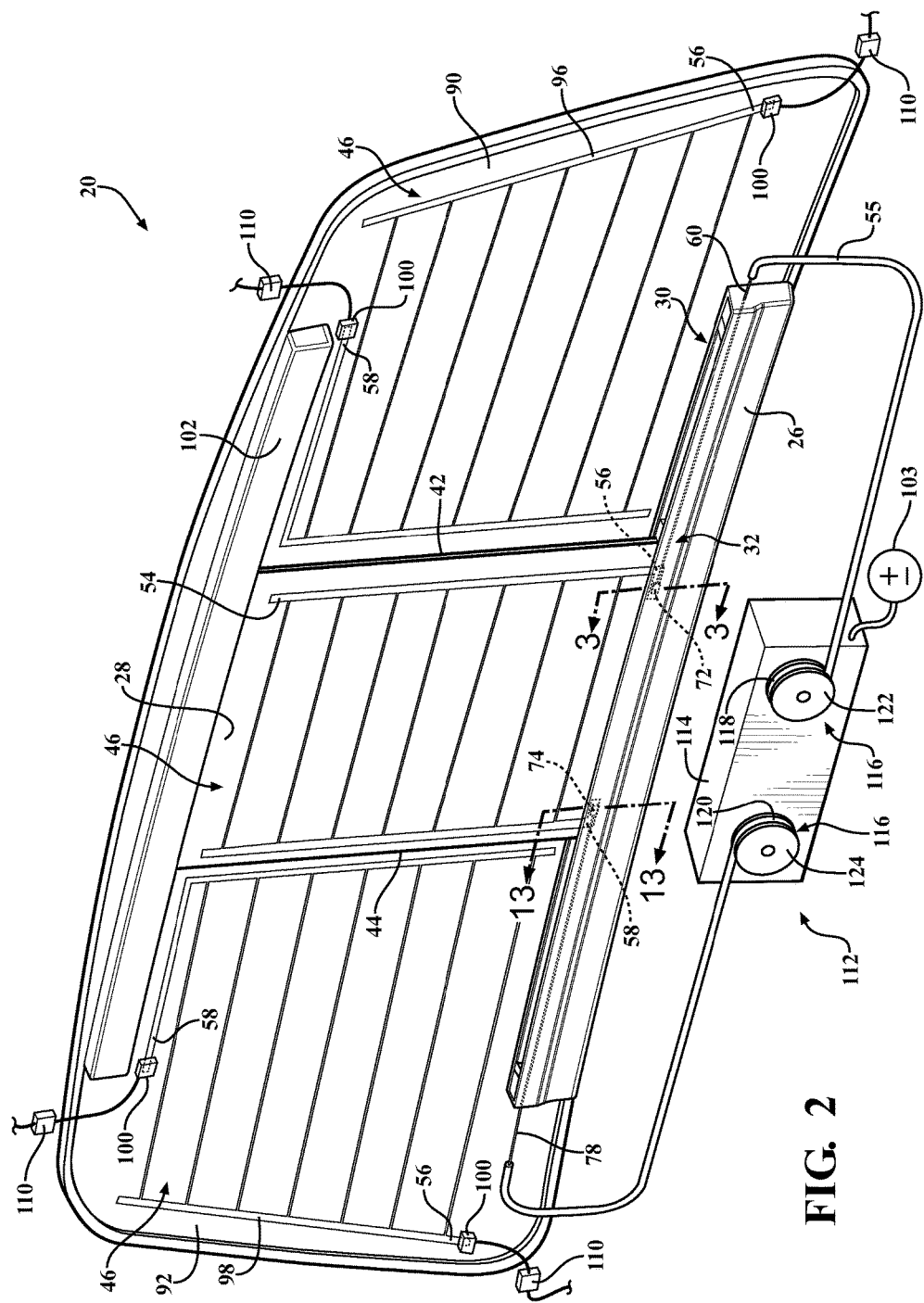
FIG. 2 is a perspective view of an interior of the sliding window assembly having a first fixed panel, a second fixed panel, and the sliding panel disposed therebetween in the closed position with a cable drive system including a motor having a first spool and a second spool.
Figure 3:
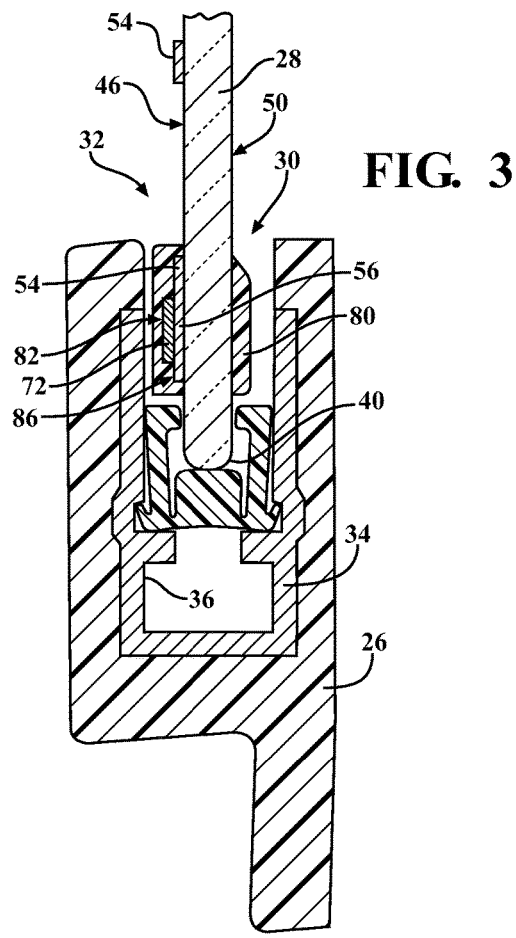
FIG. 3 is a cross-sectional view of the sliding panel, a track, and a rail disposed in the track taken along line 3-3 of FIG. 2.

As best shown in FIGS. 2 and 3, the sliding window assembly 20 includes a track 26 adapted to be coupled to the vehicle 22 and a sliding panel 28 movably coupled to the track 26. More specifically, the track 26 defines a slot 30 for receiving and guiding the sliding panel 28. The sliding panel 28 includes a bottom portion 32 at least partially disposed in the track 26. The sliding panel 28 is movable relative to the track 26 between an open position as shown in FIG. 4 and a closed position as shown in FIGS. 1, 2, 14A, 14B, 16-20.

Referring back to FIG. 3, optionally, a rail 34 is disposed in the slot 30 of the track 26 with the sliding panel 28 movably coupled to the rail 34. More specifically, the rail 34 defines a channel 36 for receiving and guiding the sliding panel 28. Typically, the bottom portion 32 of the sliding panel 28 is at least partially disposed in the channel 36 of the rail 34. The rail 34 can define a generally u-shaped configuration or any other suitable configuration or orientation. The rail 34 is typically formed of a metal material. More typically, the metal material is an alloy. Suitable alloys include aluminum or iron alloys. It is to be appreciated that the rail 34 can be formed of polymeric material(s), such as plastic material(s), or any other suitable material(s). It is to further be appreciated that the rail 34, when formed of the metal material, such as the alloy, can be conductive (as discussed further below). It is also to be appreciated that the rail 34, when formed of the polymeric material, can be non-conductive. Further, if desired, strips of conductive material can be coupled to the rail 34 when formed of the non-conductive material for allowing the rail 34 to be conductive.

Figure 4:
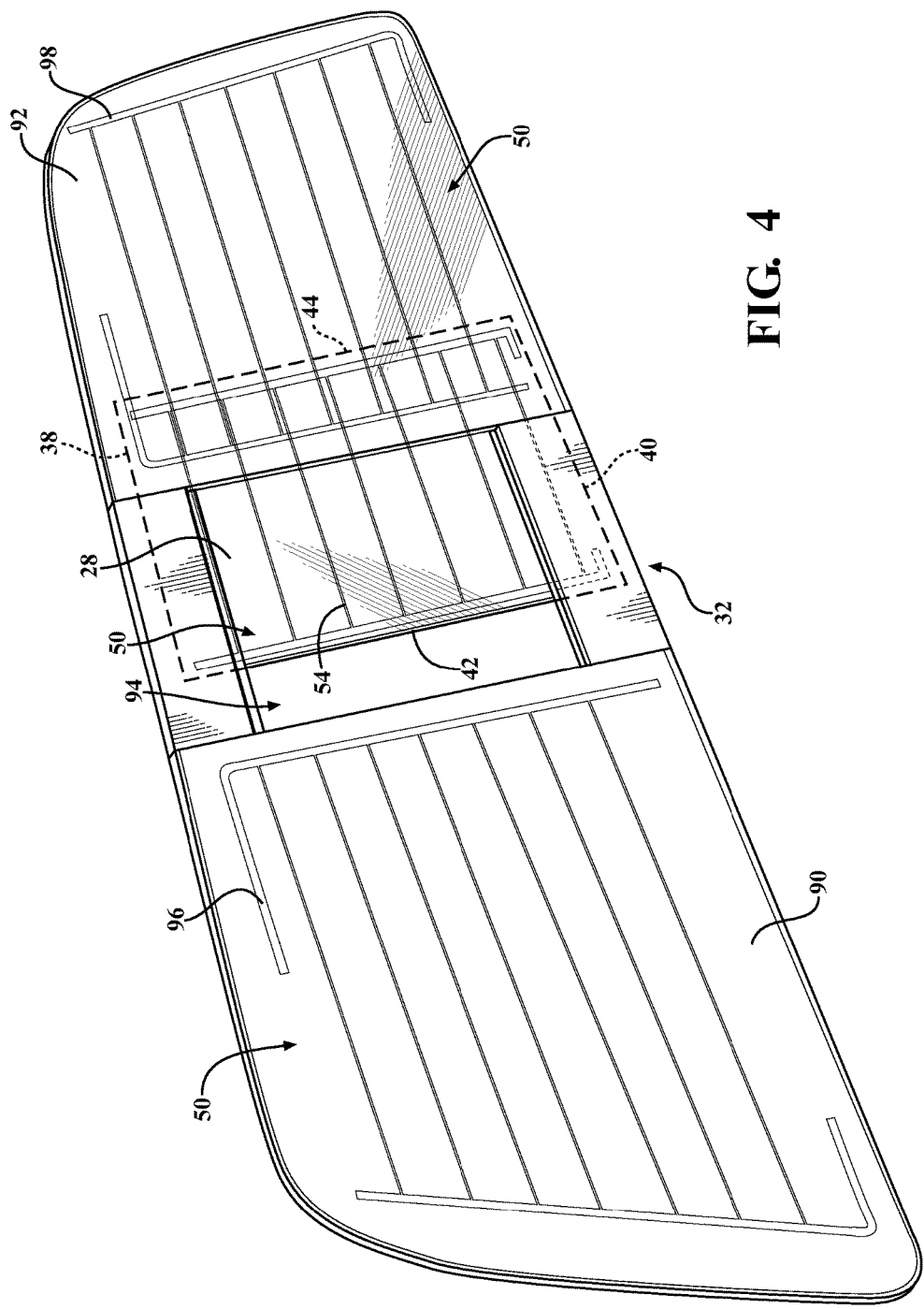
FIG. 4 is a perspective view of an exterior of the sliding window assembly having the sliding panel in an open position.

Turning to FIG. 4, the sliding panel 28 further includes a top edge 38 and a bottom edge 40 spaced from each other such that the top edge 38 opposes the bottom edge 40 with the bottom edge 40 disposed in the track 26. In addition, the sliding panel 28 includes a left edge 42 and a right edge 44 spaced from each other such that the left and right edges 42, 44 oppose each other. More specifically, the left and right edges 42, 44 are adjacent the top and bottom edges 38, 40. The sliding panel 28 has an interior surface 46 facing an interior 48 of the vehicle 22 when the sliding window assembly 20 is coupled to the vehicle 22, as best shown in FIGS. 1-3. In addition, the sliding panel 28 has an exterior surface 50 opposing the interior surface 46 such that the exterior surface 50 faces an exterior 52 of the vehicle 22 when the sliding window assembly 20 is coupled to the vehicle 22 (see FIGS. 1, 3, and 4).

Referring to FIG. 2, a heating element 54 is coupled to the sliding panel 28 for heating the sliding panel 28. More specifically, the heating element 54 may be used to defrost or defog the sliding panel 28. The heating element 54 may be coupled to any suitable surface of the sliding panel 28, such as the interior surface 46. It is to be appreciated that the heating element 54 can be coupled to the exterior surface 50 of the sliding panel 28 or any other suitable location. Those skilled in the art appreciate that the heating element 54 may heat the sliding panel 28 for purposes other than defogging or defrosting.

In some embodiments, such as is shown in FIG. 2, the heating element 54 is an electrical grid. In such embodiments, the heating element 54 includes a first end 56 and a second end 58 spaced from each other which will be discussed further below. The electrical grid is typically formed of a conductive material, such as a conductive paste and the like. The paste can be formed of silver, ceramic, or any other suitable material(s). The paste is typically bonded to the sliding panel 28. It is to be appreciated that wires or conductive film can form the heating element 54 instead of or in addition to the paste. Typically, wires are utilized with laminated glass. However, it is to be appreciated that wires can be utilized with material(s) other than laminated glass. The first and second ends 56, 58 of the sliding panel 28 can be in any suitable location. Embodiments of the electrical grid are disclosed in U.S. patent application Ser. No. 12/944,444, the disclosure of which is incorporated by reference in its entirety.

Figure 23:
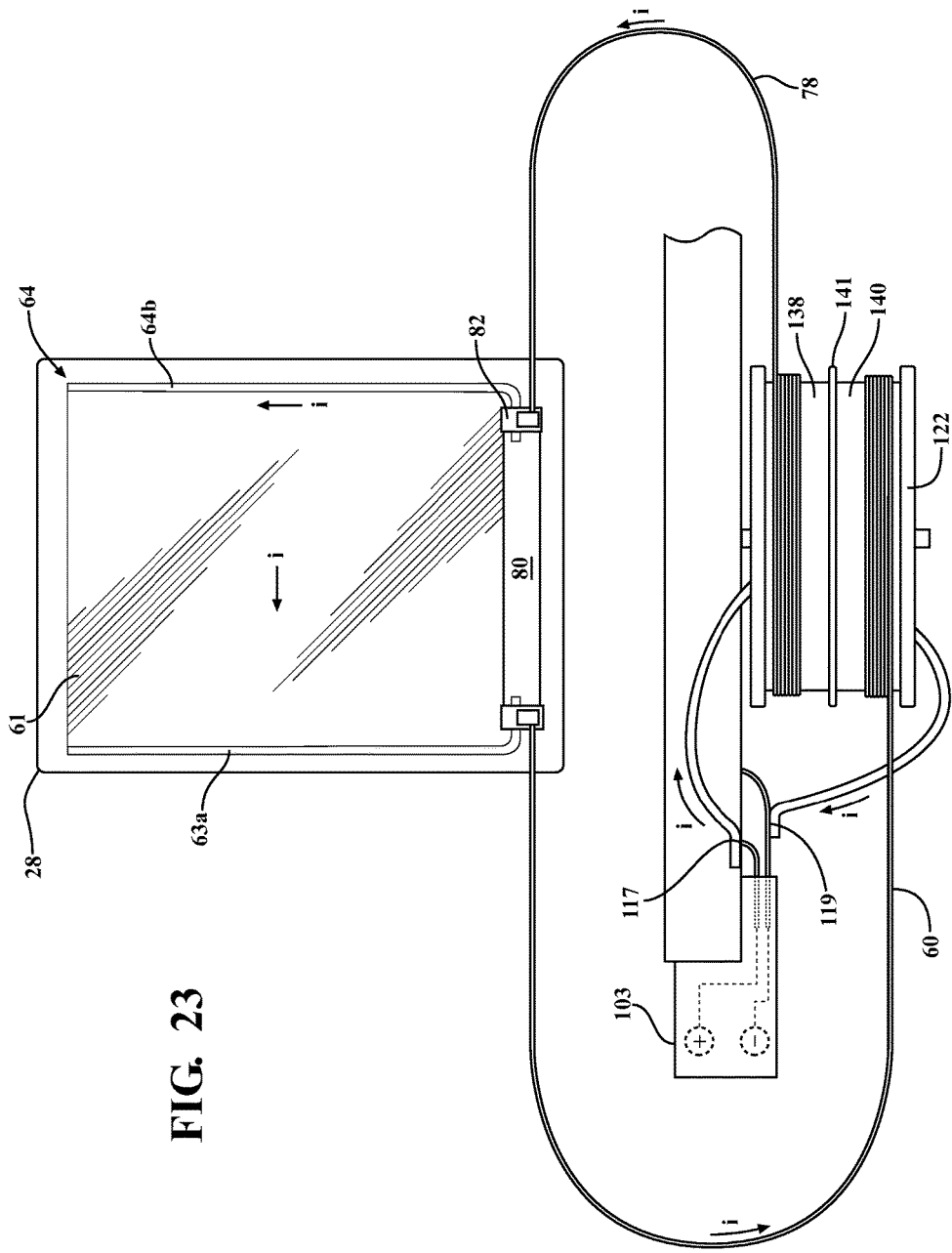
FIG. 23 is a plan view of the sliding window assembly and cable drive system according to another embodiment wherein the sliding panel includes a heating element comprising a transparent layer and wherein the spool includes electrically isolated first and second portions with the first and second conductive cables being mechanically and electrically coupled to the spool.

In other embodiments, as shown in FIG. 23, the heating element 54 is a transparent layer 61. The transparent layer 61 is disposed on the interior surface 48 or exterior surface 50 of the sliding panel 28. The transparent layer 61 is transparent such that a driver or occupant of the vehicle may see through the sliding panel 28 having the transparent layer 61. With the transparent layer 61 disposed within the sliding panel 28, the sliding panel 28 typically exhibits greater than 60 percent visible light transmission through the sliding panel 28. As used herein, the term "layer" may include one or more coatings and/or films of selected composition. The coatings and/or films forming the transparent layer 61 may be single or multiple layers. The transparent layer 61 may be disposed in the sliding panel 28 according to any suitable method, such as chemical vapor deposition, magnetron sputter vapor deposition, spray pyrolysis, and the like. The transparent layer 61 includes a metal compound such that the transparent layer 61 is electrically conductive. As such, the transparent layer 61 is a conductor exhibiting low electrical resistivity for effectively allowing flow of electric current therethrough. Preferably, the metal compound includes a metal oxide. However, the metal compound may also include a metal nitride, and the like. The metal oxide may include a tin oxide, such as indium tin oxide, or the like. The transparent layer 61 may include other metal oxides, including, but not limited to, silver oxide. The metal compound may also be doped with an additive, such as fluorine. Specifically, the additive may be included in the metal compound to optimize the light transmittance, durability, and electrical resistivity of the transparent layer 61. The transparent layer 61 preferably has a sheet resistance in a range between 0.5-20 $\Omega$/square. More preferably, the transparent layer 61 has a sheet resistance in a range between 0.7-3 $\Omega$/square. The sheet resistance may also be known as a surface resistance of the transparent layer 61. When electrical current passes through the transparent layer 61, the transparent layer 61 energizes and heats up thereby providing functionality as a defrosting or defogging element. The transparent layer 61 may occupy any suitable portion of a surface area of the sliding panel 28.

Figure 5:
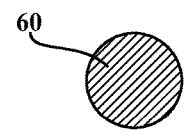
FIG. 5 is a cross-sectional view of a conductive cable according to one embodiment.
Figure 7:
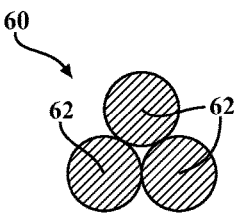
FIG. 7 is a cross-sectional view of the conductive cable according to another embodiment wherein the conductive cable includes a plurality of strands.
Figure 8:
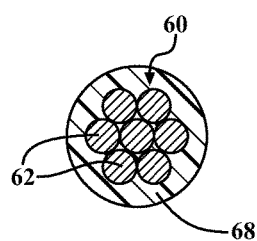
FIG. 8 is a cross-sectional view of a sheath surrounding the conductive cable according to one embodiment.
Figure 9:
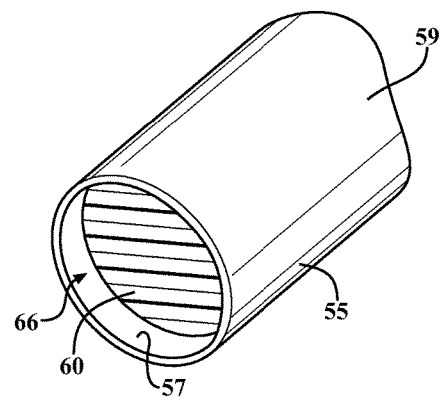
FIG. 9 is a broken cross-sectional perspective view of a conduit surrounding the conductive cable according to one embodiment.
Figure 10:
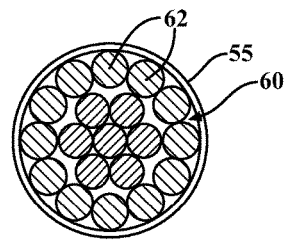
FIG. 10 is a cross-sectional view of the conduit surrounding the conductive cable having a plurality of different sized strands according to one embodiment.

The sliding window assembly 20 further includes a conductive cable 60 coupled to the sliding panel 28 for moving the sliding panel 28 between the open and closed positions. As shown in FIGS. 5 and 9, the conductive cable 60 may include one strand 62. Alternatively, as shown in FIGS. 7, 8, and 10, the conductive cable 60 may include a plurality of strands 62. The strand 62 or strands 62 form the core of the conductive cable 60. The conductive cable 60 may include any suitable number of strands 62. The conductive cable 60 may have an R×S configuration where "R" represents a number of ropes and "S" represents the number of strands per rope. For example, the conductive cable 60 may have a 1×S configuration such that the conductive cable 60 has a single rope. In one example, as shown in FIG. 8, the cable has a 1×7 construction such that the conductive cable 60 has a single rope including 7 strands (7 strands total). In another example, as shown in FIG. 10, the conductive cable 60 has a 1×19 configuration such that the conductive cable 60 has the single rope including 19 strands (19 strands total). In yet another embodiment, "R" may be greater than one such the conductive cable 60 includes many ropes. For example, the conductive cable 60 may have a 7×7 configuration wherein the conductive cable 60 includes 7 ropes with each rope including 7 strands (49 total strands).

Figure 6:
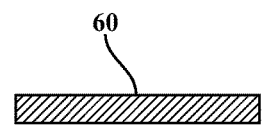
FIG. 6 is a cross-sectional view of the conductive cable according to another embodiment.

Each strand 62 may have any suitable cross-sectional diameter. Depending on the configuration of the conductive cable 60, each of the strands 62 may have the same cross-sectional diameter, as shown in FIG. 8 for example. Alternatively, as shown in FIG. 10, for example, different strands 62 may have different cross-sectional diameters. The plurality of strands 62 may be intertwined to define a braided conductive cable. In other examples, the plurality of strands 62 may be concentrically disposed such that the strands 62 are generally disposed in parallel with another rather than being intertwined. The strand 62 or plurality of strands 62 may have any suitable cross-section, such as a circular cross-section, rectangular cross-section, square cross-section, and the like. For example, as shown in FIG. 6, the conductive cable 60 has a flat, rectangular, cross-section. Those skilled in the art appreciate the core of the conductive cable 60 may have other strand arrangements not specifically recited herein and that different configurations may be more suitable depending on the application.

The conductive cable 60 is configured to undergo mechanical force to move the sliding panel 28. As is described in detail below, the conductive cable 60 is pulled or pushed causing the conductive cable 60 to undergo tension or compression, respectively. Specifically, the conductive cable 60 undergoes tension or compression to move the sliding panel 28. The mechanical force is applied to the strand 62 or strands 62 of the conductive cable 60. That is, the strand 62 or strands 62 undergo tension or compression. When the conductive cable 60 includes one strand 62, the mechanical force is applied to the one strand 62. When the conductive cable 60 includes more than one strand 62, the mechanical force is applied through the strands 62 collectively. The load is shared between the strands 62. The conductive cable 60 remains mechanically coupled to the sliding panel 28 in both the open and closed positions.

The conductive cable 60, and more specifically, the strand or strands 62 collectively, exhibit any suitable load bearing properties, such as breaking strength, to allow the conductive cable 60 to move the sliding panel 28. For example, the breaking strength of the conductive cable 60 may be 50 lbs, 100 lbs, 500 lbs, 1000 lbs, 2000 lbs, and the like. This breaking strength allows the conductive cable 60 to undergo mechanical force to move the sliding panel 28.

The breaking strength of the conductive cable 60 is much greater than breaking strengths of conventional SAE electrical wire wherein, for example, the breaking strength of 18 gauge electrical wire is about 38 lbs, and the breaking strength of 22 gauge electrical wire is about 15 lbs. Such load bearing properties of conventional electrical wires may be insufficient and unsuitable to bear loads required to move the sliding panel 28. Those skilled in the art appreciate the conductive cable 60 may exhibit other load bearing related properties that are distinguished from conventional electrical wires, such as tensile strength, density, elasticity, and the like.

In addition to being coupled to the sliding panel 28, the conductive cable 60 is further coupled to the heating element 54. The conductive cable 60 is configured to transfer electrical current to energize the heating element 54. The conductive cable 60 functions both to move the sliding panel 28 between the open and closed positions and to supply electrical energy to energize the heating grid 54 of the sliding panel 28. The heating element 54 is only energized via the conductive cable 60 that moves the sliding panel 28. The conductive cable 60, therefore, serves a dual electro-mechanical purpose. In other words, the conductive cable 60 that moves the sliding panel 28 is the same conductive cable 60 that transfers electrical current to the heating element 54.

Electrical current is shown throughout the Figures as "i" and the direction of the flow of the electrical current is indicated with an arrow. Those skilled in the art appreciate that the flow of electrical current, as illustrated, is based on conventional current flow (i.e., positive to negative). Of course, electrons may flow from negative to positive depending on whether electron charge flow convention is used.

Thus, electrical wiring separate and independent from the conductive cable 60 is not required to transfer electrical current to the heating element 54. For example, with reference to U.S. patent application Ser. No. 12/944,444, the disclosure of which is incorporated by reference in its entirety, the conductive cable 60 as described herein eliminates the need for a separate conductive element coupled with the cable and moving concurrently with the cable.

The conductive cable 60 is electrically conductive. In other words, the conductive cable 60 is a conductor that allows the flow of electrical current along its length. When the conductive cable 60 includes one strand 62, the electrical current is transferred through the one strand 62. When the conductive cable 60 includes more than one strand 62, the electrical current is transferred through the strands 62 collectively. Conductivity of the conductive cable 60 allows the conductive cable 60 to transfer electrical current to energize the heating element 54. The conductive cable 60 remains electrically coupled to the heating element 54 in both the open and closed positions.

The conductive cable 60 may be formed of any suitable material for withstanding appropriate mechanical loads and for allowing appropriate transfer of electrical current. In other words, the conductive cable 60 may have any suitable electrical or compositional properties for sufficiently enabling the conductive cable 60 to both undergo mechanical force and transfer electrical current. For example, the conductive cable 60 may be formed of metal material(s), such as, for example copper, steel or any other suitable conductive material(s). The conductive cable 60 may be coated with zinc or any other suitable coating(s). For example, in one example, the conductive cable 60 is zinc coated and steel braided.

The conductive cable 60 exhibits any suitable conductivity or resistivity to allow transfer of electrical current. For example, at 20 degrees Celsius, the conductive cable 60 may exhibit a conductivity of greater than $1 \times 10^7$ S/m, greater than $3 \times 10^7$ S/m, or greater than $6 \times 10^7$ S/m. Similarly, the conductive cable 60 exhibits any suitable resistivity to allow transfer of electrical current. For example, the conductive cable 60 may exhibit resistivity of less than 20 Ω/m, less than 10 Ω/m, less than 1 Ω/m, and the like. In spite of having breaking strength much greater than conventional electrical wire, the conductive cable 60 exhibits conductivity that is comparable to the conductivity of conventional electrical wire.

As shown in FIGS. 9 and 10, a conduit 55 may surround the conductive cable 60. In other words, the conduit defines a hollow 66 receiving the conductive cable 60 with the conduit 55 surrounding the conductive cable 60. Specifically, the conduit 55 has an interior surface 57 surrounding the conductive cable 60 and an exterior surface 59 being exposed. The conductive cable 60 is disposed in the conduit 55. The conductive cable 60 is the sole component within the conduit 55 configured to transfer electrical current to energize the heating element 54 or to undergo mechanical force to move the sliding panel 28. The conduit 55 functions to protect the conductive cable 60 from environmental conditions and physical damage. The conduit 55 may be formed of any suitable material, such as a polymeric material and the like.

In some embodiments, a sheath 68 may surround the conductive cable 60. In one example, as shown in FIG. 8, the sheath 68 is disposed or sandwiched between the conductive cable 60 and the conduit 55. The sheath 68 can be formed of polymeric material(s). The polymeric material(s) can be further defined as plastic material(s). The sheath 68 can be formed of thermoplastic, polyethylene, nylon, polyvinyl chloride (PVC), and any other suitable material(s). The sheath 68 may be used to hold the strands 62 in place and protect other components of the sliding window assembly 20 and the vehicle 22 from conducting electrical current from the strands 62. Alternatively or additionally, the sheath 68 may function to reduce friction between the conductive cable 60 and the conduit 55. In other embodiments, more than one sheath 68 may surround the conductive cable 60.

Figure 11:
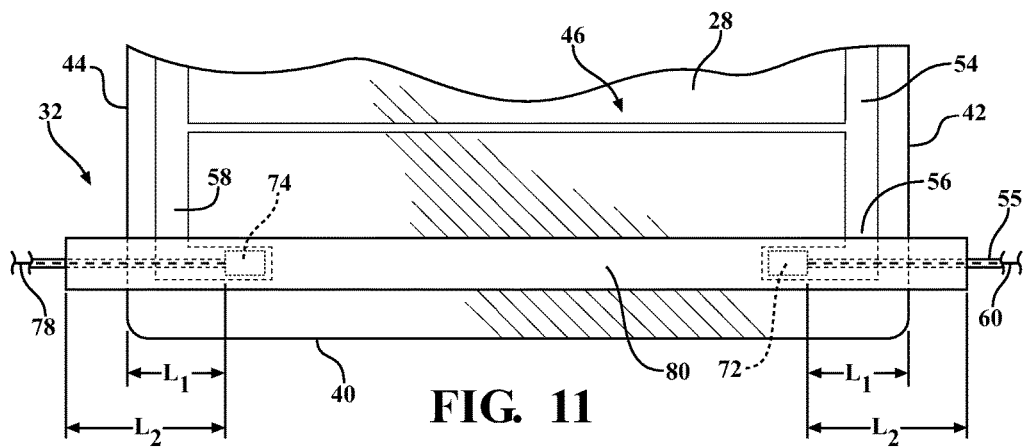
FIG. 11 is a broken plan view of the sliding panel with a bracket coupled to a bottom portion of the sliding panel with the conductive cable coupled to the bracket.

As best shown in FIGS. 2 and 11, in one embodiment, the conductive cable 60 includes a first terminal end 72 coupled to the first end 56 of the heating element 54 and a second terminal end 74 coupled to the second end 58 of the heating element 54 for electrically connecting the heating element 54 to the conductive cable 60. The terminal ends 72, 74 are electrically conductive to allow electrical current to pass from conductive cable 60 through the terminal ends 72, 74 and vice versa. The first and second terminals 72, 74 may be additionally configured to withstand mechanical loads for moving the sliding panel 28. In one embodiment, the first and second terminal ends 72, 74 extend outwardly away from the conductive cable 60 to enable the first and second terminal ends 72, 74 to be exposed to the first and second ends 56, 58 of the heating element 54, respectively. The first and second terminal ends 72, 74 may extend beyond the conduit 55 and the sheath 68 to enable the first and second terminal ends 72, 74 to be exposed to the first and second ends 56, 58 of the heating element 54, respectively. It is to be appreciated that the conductive cable 60 can be any suitable configuration or orientation or location for electrically connecting to the heating element 54.

The first and second terminal ends 72, 74 are coupled to the first and second ends 56, 58 of the heating element 54 of the sliding panel 28, respectively by any appropriate method, such as soldering, welding, adhesive, conductive epoxy, and the like.

In certain alternatives, the conductive cable 60 is further defined as a first conductive cable 60 for moving the sliding panel 28 to the closed position and the sliding window assembly 20 further includes a second conductive cable 78 for moving the sliding panel 28 to the open position. The second conductive cable 78 includes characteristics, properties, and features similar to the first conductive cable 60, as described above. The first conductive cable 60 is coupled to the first terminal end 72 and the second conductive cable 78 is coupled to the second terminal end 74.

The first terminal end 72 extends outwardly away from the first conductive cable 60 to enable the first terminal end 72 to be exposed to the first end 56 of the heating element 54. Likewise, the second terminal end 74 extends outwardly away from the second conductive cable 78 to enable the second terminal end 74 to be exposed to the second end 58 of the heating element 54. The first and second terminal ends 72, 74 can be coupled to the heating element 54 of the sliding panel 28 at any suitable location.

Figure 22:
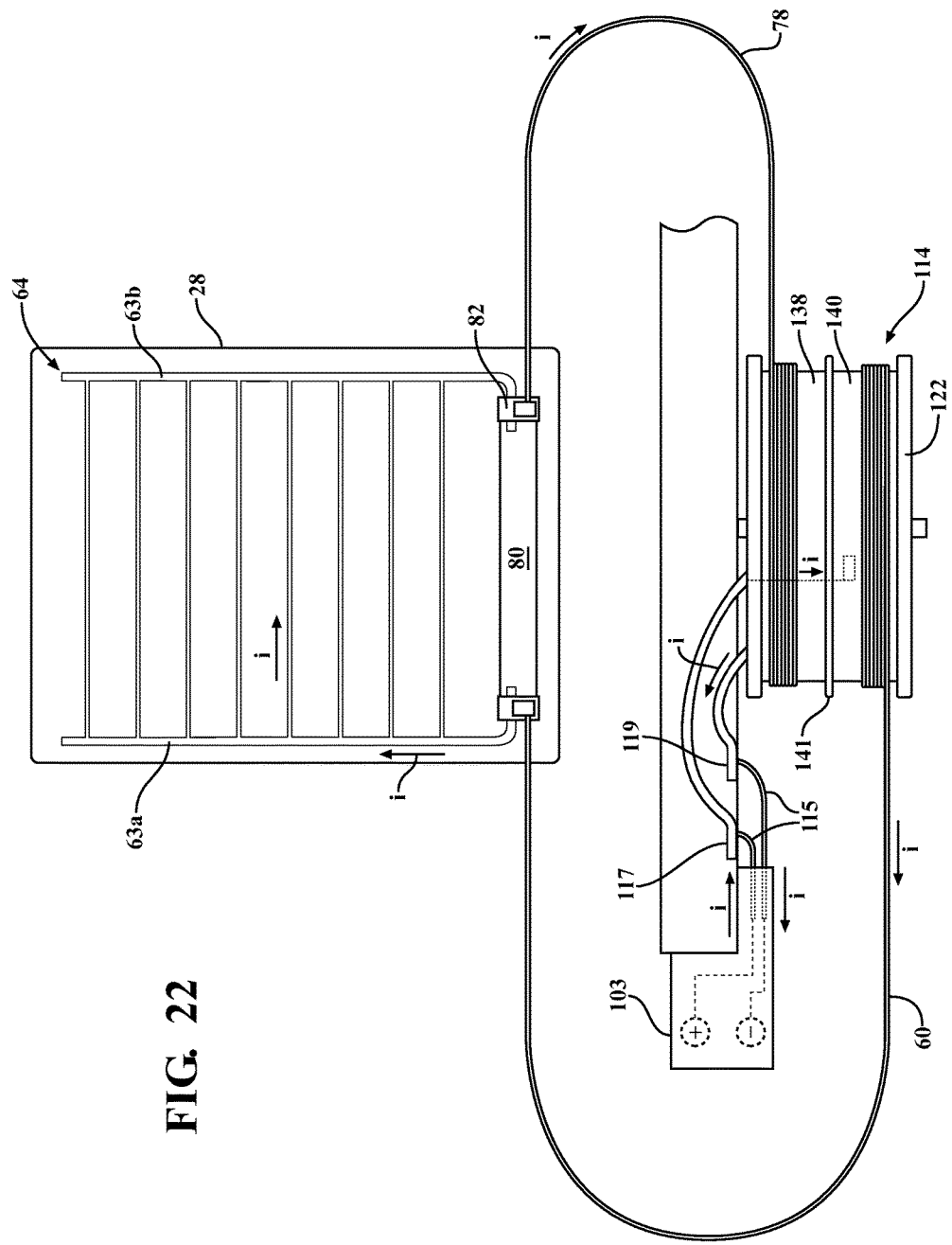
FIG. 22 is a plan view of the sliding window assembly and cable drive system according to one embodiment wherein the sliding panel includes an electrical heating grid and wherein the spool includes electrically isolated first and second portions with the first and second conductive cables being mechanically and electrically coupled to the spool.
Figure 24:
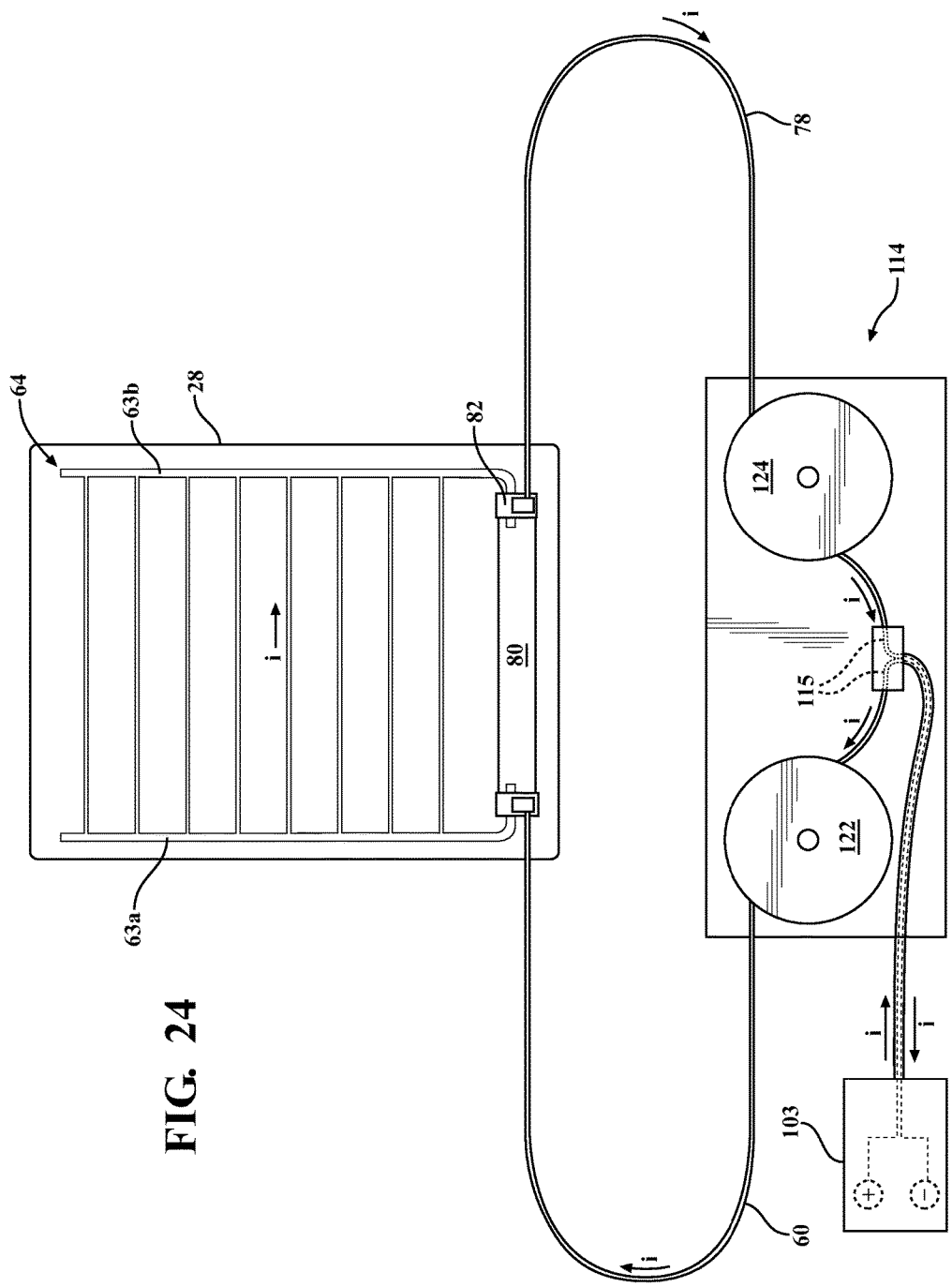
FIG. 24 is a plan view of the sliding window assembly and cable drive system according to yet another embodiment wherein the sliding panel includes the first conductive cable mechanically and electrically coupled to the first spool and the second conductive cable mechanically and electrically coupled to the second spool.

The sliding panel 28 may include at least one bus bar 63 disposed on the sliding panel 28. The bus bar 63 comprises a conductive strip or bar for conducting electrically to the heating element 54. The bus bar 63 may be comprised of any conductive material, such as copper paste, and the like. In one example, as shown in FIGS. 22-24, a first bus bar 63a is disposed adjacent the left edge 42 of the sliding panel 28 and a second bus bar 63 is disposed adjacent the right edge 44 of the sliding panel 28. More specifically, the first bus bar 63a is disposed adjacent the first end 56 of the heating element 54 and the second bus bar 63b is disposed adjacent the second end 58 of the heating element 54. Depending on the application, the first and second bus bars 63a, 63b are electrically coupled to the electrical grid or the transparent layer 61.

The conductive cable 60 may be coupled to the heating element 54 according to various embodiments. The conductive cable 60 may be directly or indirectly coupled to the heating element 54. When directly coupled to the heating element 54, the conductive cable 60 is in direct abutting connection with the heating element 54. When indirectly coupled to the heating element 54, there exists an intermediary conductive element between the conductive cable 60 and the heating element 54. For example, the conductive cable 60 may be coupled to the heating element 54 via the bus bars 63a, 64b. The first and second bus bars 63a, 63b may be electrically coupled to the conductive cable 60, and more specifically, the first and second conductive cables 60, 78. The first terminal end 72 may be coupled to the first bus bar 63a and the second terminal end 74 may be coupled to the second bus bar 63b. The first and second terminal ends 72, 74 may be coupled to the first and second bus bars 63a, 63b according to any suitable method, such as soldering and the like. The first and second terminal ends 72, 74 may be directly or indirectly coupled electrically with the first and second bus bars 63a, 63. Those skilled in the art realize that the conductive cable 60 may be coupled to the heating element 54 according to various other configurations not specifically described herein.

In one example, electrical current passes through the first conductive cable 60 to the first terminal 72 to the first bus bar 63a to the heating element 54. After passing through the heating element 54, electrical current then passes to the second bus bar 63b, to the second terminal end 74 to the second conductive cable 78. Depending on power supply polarity, the path of the electrical current may be opposite as described.

Figure 12:
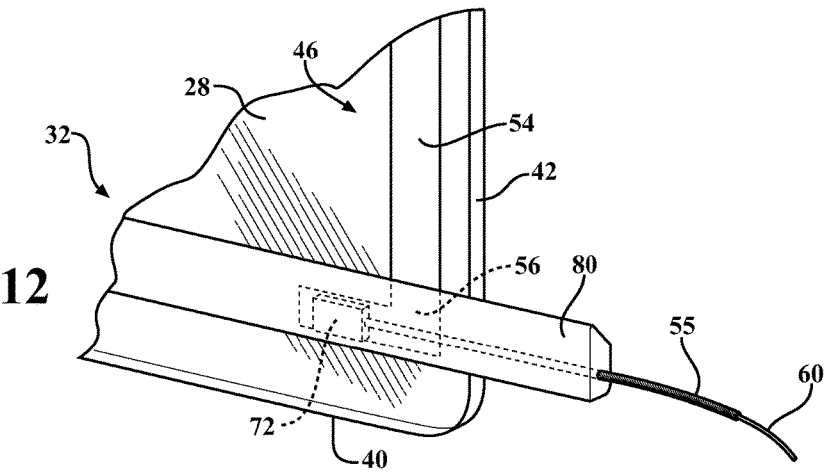
FIG. 12 is a broken perspective view of the sliding panel with the bracket coupled to the bottom portion of the sliding panel with the conductive cable coupled to the bracket.

In another embodiment, as best shown in FIGS. 3, 11, and 12, the sliding window assembly 20 further includes a bracket 80 coupled to the sliding panel 28 with the conductive cable 60 coupled to the bracket 80. More specifically, the bracket 80 is coupled to the bottom portion 32 of the sliding panel 28. In one alternative, the bracket 80 is coupled to the sliding panel 28 proximal to the bottom edge 40 of the sliding panel 28. It is to be appreciated that the bracket 80 can be coupled to the sliding panel 28 in any suitable location. Typically, the first and second conductive cables 60, 78 are coupled to the bracket 80 to enable the first and second conductive cables 60, 78 to move the bracket 80, which moves the sliding panel 28 between the open and closed positions. The bracket 80 transfers the force from the conductive cable 60 to the sliding panel 28 for moving the sliding panel 28 within the track 26.

The bracket 80 may be disposed in the channel 36 of the rail 34 such that the bracket 80 is hidden from a user's sight. The bracket 80 is substantially parallel to the bottom edge 40 of the sliding panel 28 and typically spans a substantial majority or an entirety of the length of the sliding panel 28. Said differently, the bracket 80 runs along the bottom portion 32 of the sliding panel 28 and may extend past both the left and right edges 42, 44 of the sliding panel 28, as shown in FIG. 11.

The first and second conductive cables 60, 78 each define a first predetermined length $L_1$ overlapping the sliding panel 28 to electrically connect to the heating element 54, and more specifically, to electrically connect the first and second terminal ends 72, 74 to respective first and second ends 56, 58 of the heating element 54. In addition, the first and second conductive cables 60, 78 each define a second predetermined length $L_2$ disposed within the bracket 80 such that the bracket 80 supports the first and second conductive cables 60, 78 as the conductive cables 60, 78 move the bracket 80 that moves the sliding panel 28 between the open and closed positions. Typically, the second predetermined length $L_2$ is greater than the first predetermined length $L_1$. It is to be appreciated that the first predetermined length $L_1$ can be equal to the second predetermined length $L_2$ or the first predetermined length $L_1$ can be greater than the second predetermined length $L_2$.

Figure 13:
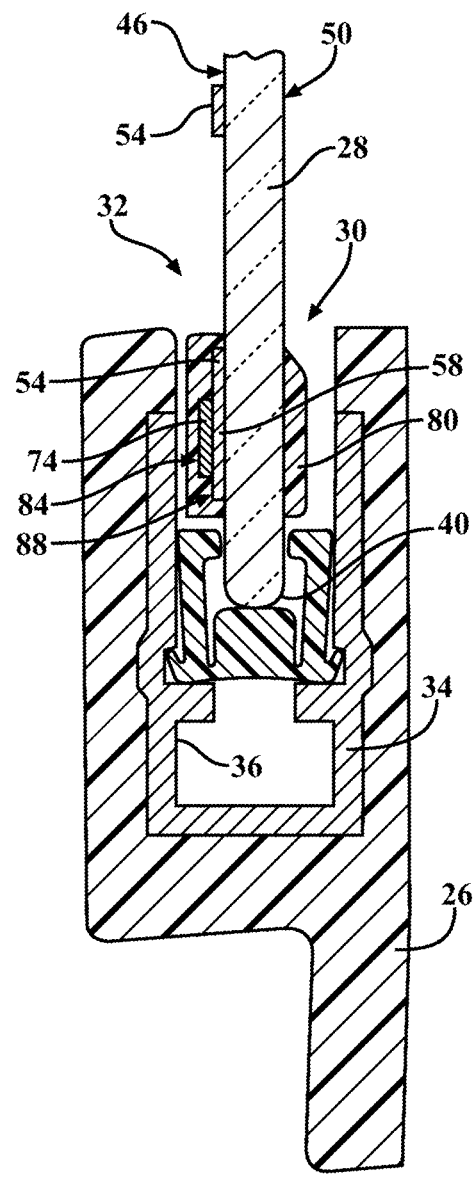
FIG. 13 is a cross-sectional view of the sliding panel, the track, and the rail disposed in the track taken along line 13-13 of FIG. 2.

Referring to FIG. 3, the bracket 80 defines a first pocket 82 receiving the first terminal end 72 for positioning the first terminal end 72 into engagement with the first end 56 of the heating element 54. Referring to FIG. 13, the bracket 80 further defines a second pocket 84 receiving the second terminal end 74 for positioning the second terminal end 74 into engagement with the second end 58 of the heating element 54. The first and second pockets 82, 84 may receive the first and second terminal ends 72, 74 for positioning the first and second terminal ends 72, 74 with the first and second bus bars 63a, 63b. As shown in FIG. 3, the bracket 80 also defines a first groove 86 adjacent the first pocket 82 for receiving the first end 56 of the heating element 54. As shown in FIG. 13, the bracket 80 also defines a second groove 88 adjacent the second pocket 84 for receiving the second end 58 of the heating element 54.

The bracket 80 may be coupled to the sliding panel 28 by any suitable method, such as, for example, encapsulation, molding, bonding, etc. Generally, encapsulation results in an encapsulant that can be used to couple the bracket 80 to the sliding panel 28. In addition, encapsulation can be further defined as single-sided encapsulation, two-sided encapsulation, or three-sided encapsulation. For example, with single-sided encapsulation, the bracket 80 is coupled to the interior surface 46 of the sliding panel 28 leaving the exterior surface 50 of the sliding panel 28 free of the encapsulant. When encapsulation is employed, the bracket 80 is formed, at least partially, from the encapsulant. More specifically, with respect to encapsulation, the bracket 80 is formed of the encapsulant and is coupled to the sliding panel 28 by encapsulation. It is to be appreciated that any type of encapsulation or adhesive surface bonding can be utilized for coupling the bracket 80 to the sliding panel 28.

The bracket 80 is typically coupled to the interior surface 46 of the sliding panel 28. More typically, three-sided encapsulation is utilized which results in the bracket 80 being disposed on both the interior and exterior surfaces 46, 50 of the sliding panel 28 and both the left and right edges 42, 44 of the sliding panel 28. Three-sided encapsulation increases a surface area of the sliding panel 28 that the bracket 80 is coupled to while limiting a size of the bracket 80. Increasing the surface area in turn increases the bond strength between the bracket 80 and the sliding panel 28 while also limiting the size of the bracket 80 to provide an aesthetically pleasing appearance. It is to be appreciated that the bracket 80 can be coupled to only the interior surface 46 or only the exterior surface 50 of the sliding panel 28. Alternatively, the bracket 80 can be coupled to one of the interior and exterior surfaces 46, 50 of the sliding panel 28 and one of the left and right edges 42, 44 of the sliding panel 28. Furthermore, the bracket 80 can be coupled to both the interior and exterior surfaces 46, 50 and one of the left and right edges 42, 44.

When utilizing encapsulation for the bracket 80, the encapsulant is typically formed of plastic material(s) and more typically, thermoplastic material(s) or thermoset material(s). Even more typically, the bracket 80 is formed of an isocyanate component and an isocyanate-reactive component. In certain embodiments, the bracket 80 is formed of polyurethane. One example of a suitable polyurethane is commercially available from BASF Corporation under the trade name of COLO-FAST™, e.g. COLO-FAST™ LM-161. It is to be appreciated that the encapsulant can be formed from various plastic material(s), such as, for example, nylon; acrylonitrile butadiene styrene (ABS); polybutylene terephthalate (PBT); polyvinyl chloride (PVC), thermoplastic elastomers (TPE); elastomeric alloys, e.g. thermoplastic vulcanizates (TPV); thermoplastic polyolefins (TPO); thermoplastic styrene (TPS); and various different types of reaction injection molding (RIM) materials; or any other suitable material(s) for encapsulation. It is to be appreciated that any other suitable material(s) can be utilized for forming the bracket 80. It is to also be appreciated that thermoplastics, such as nylon, ABS, or PBT can be utilized to form the bracket 80 as set forth above and can be bonded to the interior or exterior surfaces 46, 50 of the sliding panel 28. It is to be appreciated that a primer can be applied to the sliding panel 28 prior to molding the bracket 80 for increasing the bond strength between the bracket 80 and the sliding panel 28. Alternatively, the bracket 80 can be molded without the sliding panel 28 present and subsequently coupled to the sliding panel 28 by an adhesive.

In certain embodiments, as shown in FIGS. 1, 2, 4, 14A, 14B, 16-20, the sliding window assembly 20 further includes a first fixed panel 90 adapted to be fixed to the vehicle 22 and a second fixed panel 92 adapted to be fixed to the vehicle 22. The second fixed panel 92 is spaced from the first fixed panel 90 to define an opening 94 therebetween. The sliding panel 28 covers the opening 94 when in the closed position as shown in FIGS. 1, 2, 14A, 14B, 16-20 and the sliding panel 28 uncovers the opening 94 when in the open position as shown in FIG. 4. It is to be appreciated that the sliding panel 28 is in the open position when the sliding panel 28 is partially covering the opening 94. In other words, the sliding panel 28 is in the open position when the sliding panel 28 is completely or partially uncovering the opening 94. As such, the sliding panel 28 is in the closed position when the sliding panel 28 completely covers the opening 94.

Referring to FIGS. 1, 2, 4, 14A, 14B, 16-20, the first and second fixed panels 90, 92 each have an interior surface 46 facing the interior 48 of the vehicle 22 when the sliding window assembly 20 is coupled to the vehicle 22. Further, the first and second fixed panels 90, 92 each have an exterior surface 50 opposing the interior surface 46 such that the exterior surface 50 faces the exterior 52 of the vehicle 22 when the sliding window assembly 20 is coupled to the vehicle 22. As such, the interior surface 46 of each of the panels 28, 90, 92 face the interior 48 of the vehicle 22 and the exterior surface 50 of each of the panels 28, 90, 92 face the exterior 52 of the vehicle 22.

The first and second fixed panels 90, 92 and the sliding panel 28 may be each formed of glass. However, it is to be appreciated that the first and second fixed panels 90, 92, as well as the sliding panel 28, can each be formed from plastic material(s); metal material(s); glazing material(s), such as, for example, polymer glazing, laminated glass, tempered glass or any other suitable material(s).

A left heating element 96 is coupled to the first fixed panel 90 for defrosting or defogging the first fixed panel 90 and a right heating element 98 is coupled to the second fixed panel 92 for defrosting or defogging the second fixed panel 92. It is to be appreciated that the heating element 54 of the sliding panel 28 can be referred to as a center heating element 54.

Figure 16:
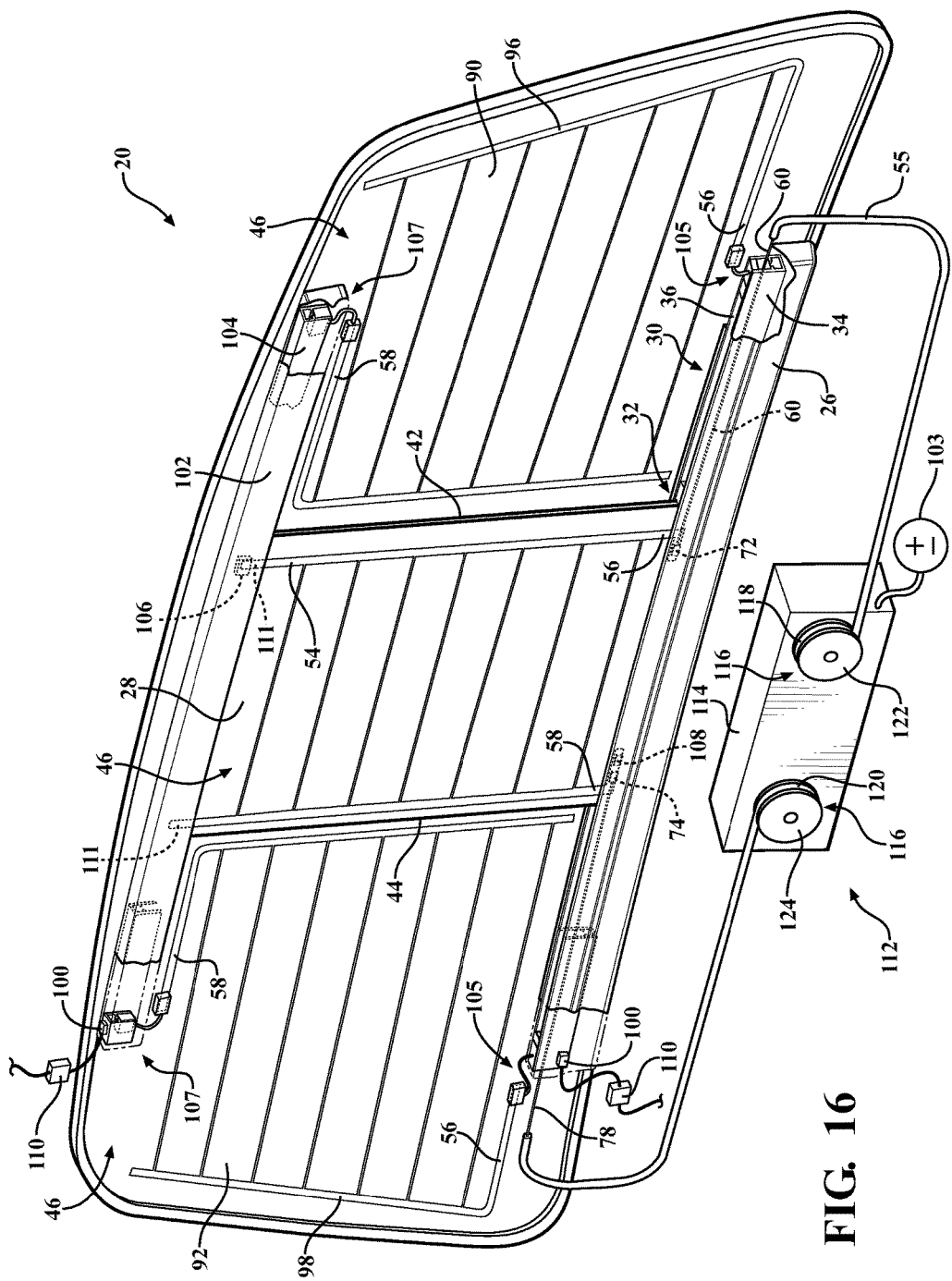
FIG. 16 is a perspective view of an interior of another sliding window assembly with the first and second conductive rails and the cable drive system having the first and second spools with a second upper connector and a second lower connector coupled to the sliding panel.
Figure 17:
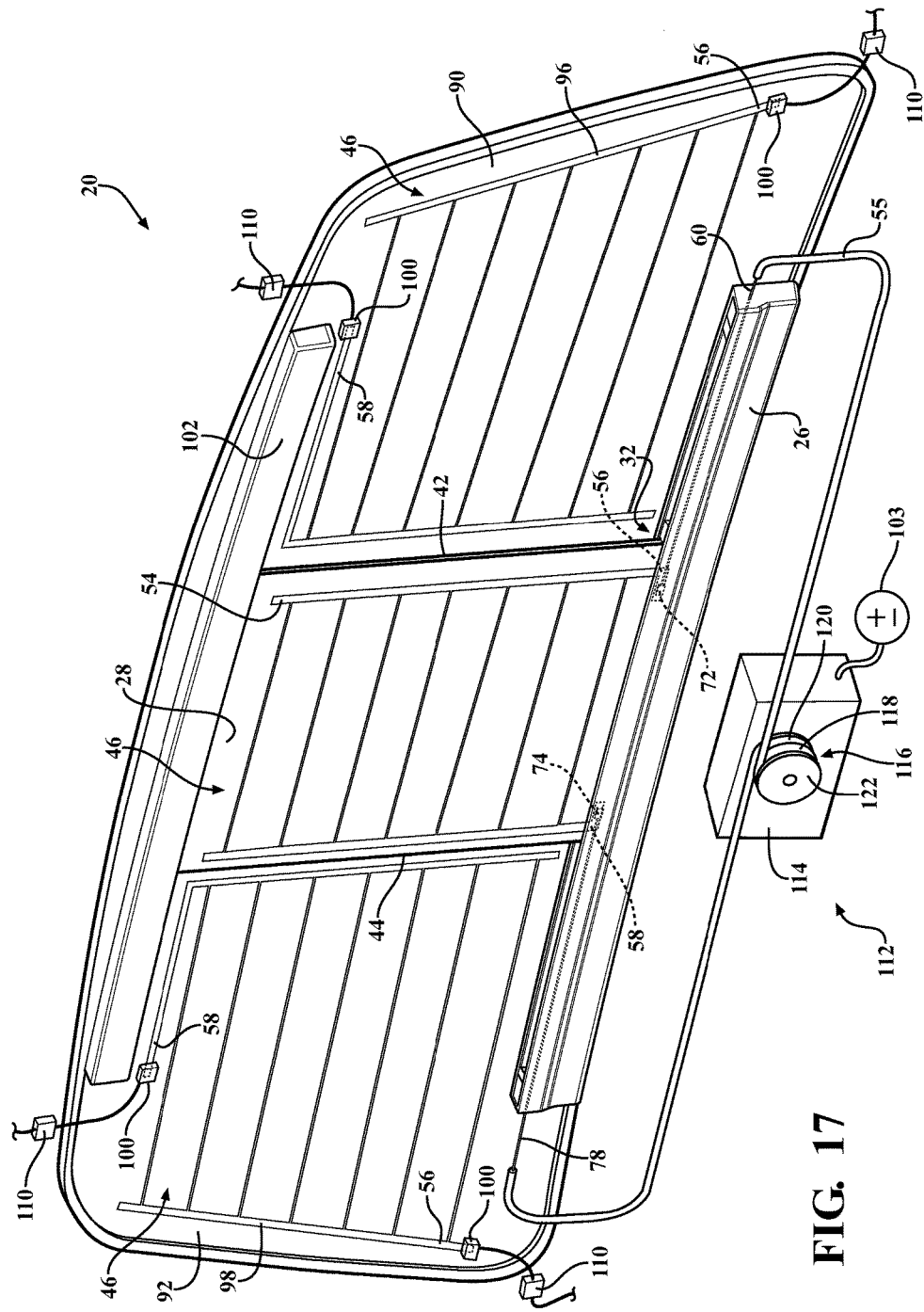
FIG. 17 is a perspective view of the interior of the sliding window assembly and another cable drive system including a motor having a first spool with a first conductive cable and a second conductive cable each coupled to the first spool.
Figure 18:
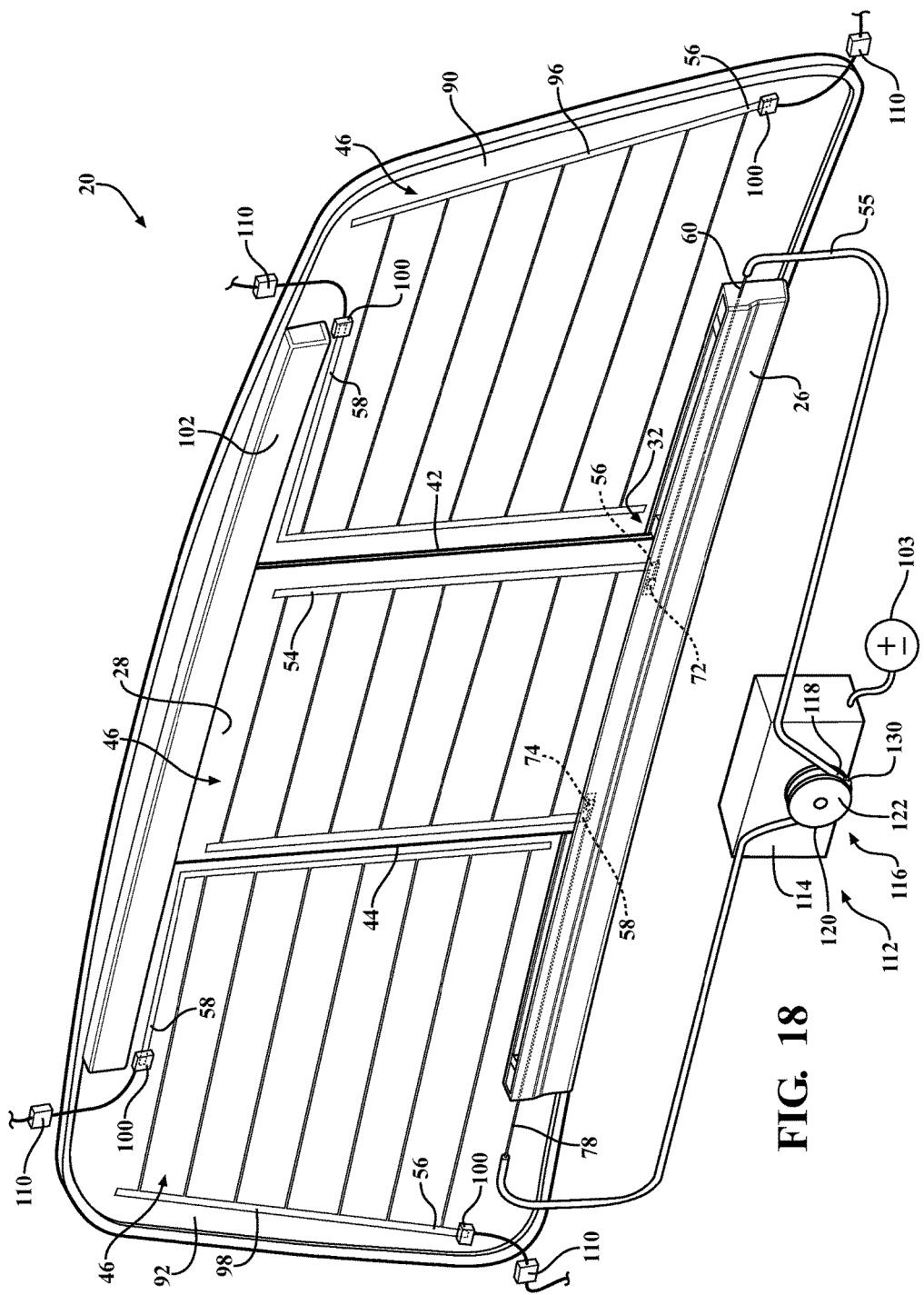
FIG. 18 is a perspective view of an interior of a sliding window assembly and yet another cable drive system including a motor having a first spool with the conductive cable disposed about a portion of the first spool.

Referring to FIGS. 2, 14A, 14B, 16-20, the left and right heating elements 96, 98 each include a first end 56 and a second end 58 spaced from each other. It is to be appreciated that the first and second ends 56, 58 of each of the left and right heating elements 96, 98 can be in any suitable location. A plurality of connectors 100 may be coupled to the left and right heating elements 96, 98 for allowing electrical current to flow therethrough. For example, FIGS. 2, 17, and 18 illustrate four connectors 100 with two connectors 100 coupled to the left heating element 96 and two connectors 100 coupled to the right heating element 98. More specifically, one of the connectors 100 is coupled to the first end 56 of the left heating element 96 and another one of the connectors 100 is coupled to the second end 58 of the left heating element 96. Likewise, yet another one of the connectors 100 is coupled to the first end 56 of the right heating element 98 and yet another one of the connectors 100 is coupled to the second end 58 of the right heating element 98.

As another example, FIGS. 14A, 14B, 16, 19, and 20, illustrate only two connectors 100, which will be discussed further below. The connectors 100 are in electrical communication with a power supply 103 of the vehicle 22, which is also as discussed further below. The connectors 100 are commonly referred to as pigtail connectors 100 as known to those skilled in the art. The connectors 100 can be coupled to the first and second ends 56, 58 of the left and right heating elements 96, 98 by soldering. It is to be appreciated that the connectors 100 can be coupled to the first and second ends 56, 58 of the left and right heating elements 96, 98 by welding, adhesive, or any other suitable method. It is to further be appreciated that the connectors 100 can be coupled to the left and right heating elements 96, 98 at any suitable location.

The embodiments above relate to electrical connections for the heating elements 96, 98 of the first and second fixed panels 90, 92. The heating elements 96, 98 of the first and second fixed panels 90, 92 may utilize separate and independent electrical connections because the fixed panels 90, 92 do not slide or move. To the contrary, as described herein, electrical connections to the center heating element 54 are provided by the conductive cable 60 as the conductive cable 60 moves the sliding panel 28 and energizes the heating element 54.

Typically, the track 26 is coupled to the first and second fixed panels 90, 92 such that the sliding panel 28 moves relative to the first and second fixed panels 90, 92 between the open position uncovering the opening 94 and the closed position covering the opening 94. In certain embodiments, the track 26 is further defined as a first track 26 and further includes a second track 102 spaced from the first track 26 with the second track 102 also coupled to the first and second fixed panels 90, 92. Typically, the second track 102 is spaced above the first track 26 with the sliding panel 28 movably coupled to the first and second tracks 26, 102. In other words, the first and second tracks 26, 102 are disposed horizontally in a substantially spaced and parallel relationship such that the sliding panel 28 moves horizontally back and forth relative to the first and second fixed panels 90, 92. The first and second tracks 26, 102 can be positioned in any other suitable orientation or location, such as, for example, vertically spaced such that the sliding panel 28 moves vertically up and down relative to the first and second fixed panels 90, 92. The rail 34 as discussed above can be further defined as a first rail 34 coupled to the first track 26 and further including a second rail 104 coupled to the second track 102 for receiving and guiding the sliding panel 28 (see FIGS. 14A, 14B, 16, 19, and 20). The second track 102 can be configured generally the same as the first track 26 and the second rail 104 can be configured generally the same as the first rail 34. It is to be appreciated that various mechanical and electrical components can be re-orientated or relocated to accommodate vertical tracks 26, 102 and vertical rails 34, 104 for vertical movement of the sliding panel 28.

The first and second tracks 26, 102 are typically coupled to the first and second fixed panels 90, 92 by any suitable method, such as, for example, encapsulation, molding, bonding, etc. Generally, encapsulation results in an encapsulant that can be used to couple the first and second tracks 26, 102 to the first and second fixed panels 90, 92. As discussed above, encapsulation can be further defined as single-sided encapsulation, two-sided encapsulation, or three-sided encapsulation. For example, with single-sided encapsulation, the first and second tracks 26, 102 are coupled to the interior surface 46 of the first and second fixed panels 90, 92 leaving the exterior surface 50 of the first and second fixed panels 90, 92 free of the encapsulant. When encapsulation is employed, the first and second tracks 26, 102 are formed, at least partially, from the encapsulant. More specifically, with respect to encapsulation, the first and second tracks 26, 102 are formed of the encapsulant and are coupled to the first and second fixed panels 90, 92 by encapsulation. It is to be appreciated that any type of encapsulation or adhesive surface bonding can be utilized for coupling the first and second tracks 26, 102 to the first and second fixed panels 90, 92.

When utilizing encapsulation for the first and second tracks 26, 102, the encapsulant is typically formed of plastic material(s) and more typically, thermoplastic material(s) or thermoset material(s). Even more typically, the plastic material is polyvinyl chloride (PVC). It is to be appreciated that the encapsulant can be formed from various plastic material(s), such as, for example, thermoplastic elastomers (TPE); elastomeric alloys, e.g. thermoplastic vulcanizates (TPV); thermoplastic polyolefins (TPO); thermoplastic styrene (TPS); polyurethane; and various different types of reaction injection molding (RIM) materials, or any other suitable material(s) for encapsulation. One example of a suitable polyurethane is commercially available from BASF Corporation under the trade name of COLO-FAST™, e.g. COLO-FAST™ LM-161. However, it is to be appreciated that any other suitable material(s) can be utilized for forming the first and second tracks 26, 102.

Referring to FIGS. 14A, 14B, 16, 19, and 20, in certain embodiments, the rail 34 can be further defined as a conductive rail 34 in electrical connection to at least one of the left and right heating elements 96, 98, as further disclosed in U.S. patent application Ser. No. 12/944,448, the disclosure of which is incorporated by reference in its entirety. In other words, the conductive rail 34 is in electrical connection to the left heating element 96 of the first fixed panel 90 or the right heating element 98 of the second fixed panel 92. In one alternative, the conductive rail 34 is in electrical connection to both the left and right heating elements 96, 98 of the first and second fixed panels 90, 92, respectively. Hence, the left and right heating elements 96, 98 of the first and second fixed panels 90, 92, respectively are energized through the conductive rail 34 with the heating element 54 of the sliding panel 28 energized through the conductive cable 60, and more specifically, the first and second terminal ends 72, 74. Additional discussion of the alternatives/embodiments of the conductive rail 34 and the first and second ends 72, 74 is provided below.

In one embodiment, the conductive rail 34 can be further defined as a first conductive rail 34 coupled to the first track 26 and the sliding window assembly 10 may further include a second conductive rail 104 coupled to the second track 102 such that the first and second conductive rails 34, 104 are in electrical connection to at least one of the left and right heating elements 96, 98. In one alternative, the first and second conductive rails 34, 104 are in electrical connection to both the left and right heating elements 96, 98 of the first and second fixed panels 90, 92, respectively. Hence, the left and right heating elements 96, 98 of the first and second fixed panels 90, 92, respectively are energized through the first and second conductive rails 34, 104. Any of the conductive rail embodiments/alternatives as disclosed in U.S. patent application Ser. No. 12/944,448, the disclosure of which is incorporated by reference in its entirety, can be utilized with the conductive cables 60, 78 and terminal ends 72, 74 as disclosed herein. The left heating element 96 of the first fixed panel 90 can be energized by the conductive rail 34 while separately the right heating element 98 of the second fixed panel 90 can be energized by another conductive rail 34. For example, the left heating element 96 of the first fixed panel 90 can be energized by the first and second conductive rails 34, 104 while separately the right heating element 98 of the second fixed panel 92 can be energized by other first and second conductive rails 34, 104.

Referring to FIGS. 14A, 14B, 15, and 16, a plurality of first lower connectors 105 are each coupled to the first conductive rail 34 and a plurality of first upper connectors 107 are each coupled to the second conductive rail 104 for electrically connecting the first and second conductive rails 34, 104 to the left and right heating elements 96, 98. Typically, the first lower connectors 105 are each coupled the first conductive rail 34 and respective left and right heating elements 96, 98. Similarly, the first upper connectors 107 are each coupled to the second conductive rail 104 and respective left and right heating elements 96, 98. More specifically, each of the first lower connectors 105 are coupled to the first conductive rail 70 and respective left and right heating elements 96, 98 with each of the first upper connectors 107 coupled to the second conductive rail 104 and respective left and right heating elements 96, 98. The first lower and upper connectors 105, 107 are coupled to respective first and second ends 56, 58 of the left and right heating elements 96, 98. It is to be appreciated that the first and second ends 56, 58 of the left and right heating elements 96, 98 can be at any suitable location. The first lower and upper connectors 105, 107 can be coupled to the left and right heating elements 96, 98, as well as the first and second conductive rails 34, 104, at any suitable location. The first lower and upper connectors 105, 107 can be coupled to the first and second conductive rails 34, 104 by soldering or by any other suitable method. See U.S. patent application Ser. No. 12/944,448 for a further discussion of the first lower and upper connectors 105, 107 and the methods of coupling the first lower and upper connectors 105, 107 to the first and second conductive rails 34, 104.

Electrical current flows through the left or right heating elements 96, 98 of the first and second fixed panels 90, 92 and the heating element 54 of the sliding panel 28 by any suitable method. For alternatives/embodiments described herein, the first and second terminal ends 72, 74 energize the heating element 54 of the sliding panel 28.

In one alternative, the first and second terminal ends 72, 74 energize the heating element 54 of the sliding panel 28 and the first and second conductive rails 34, 104 energize one of the left and right heating elements 96, 98 of one of the first and second fixed panels 90, 92 respectively. In this alternative, additional first and second terminal ends 72, 74 energize the left or right heating element 96, 98. In another alternative, the first and second conductive terminal ends 72, 74 energize the heating element 54 of the sliding panel 28 and the first and second conductive rails 34, 104 energize both of the left and right heating elements 96, 98 of the first and second fixed panels 90, 92. Hence, the left and right heating elements 96, 98 of the first and second fixed panels 90, 92, respectively are energized through the first and second conductive rails 34, 104 with the heating element 54 of the sliding panel 28 energized through the first and second terminal ends 72, 74. It is to be appreciated that the heating element 54 of the sliding panel 28, as well as the left and right heating elements 96, 98 of the first and second fixed panels 90, 92, can each be energized by separate first and second terminal ends 72, 74.

The power supply 103 of the vehicle 22 is electrically coupled to at least one of the left and right heating elements 96, 98 for transferring electrical current through the left and right heating elements 96, 98. Typically, the power supply 103 is electrically coupled to both the left and right heating elements 96, 98 for transferring electrical current through the left and right heating elements 96, 98. More specifically, the power supply 103 is electrically coupled to the connectors 100 of the left and right heating elements 96, 98 for transferring electrical current through the left and right heating elements 96, 98. The power supply 103 can include a plurality of connections, and for example, can include a first connection electrically coupled to the connector 100 coupled to the first end 56 of the left heating element 96 and a second connection electrically coupled to the connector 100 coupled to the second end 58 of the left heating element 96. Likewise, another first connection is electrically coupled to the connector 100 coupled to the first end 56 of the right heating element 98 and another second connection is electrically coupled to the connector 100 of the second end 58 of the right heating element 98. In other words, the left and right heating elements 96, 98 are electrically coupled to the power supply 103 independently of each other. As such, if the electrical connection is broken in the left heating element 96, the right heating element 98 will continue to operate, and vice versa. It is to be appreciated that any suitable switches, relays, etc. can be utilized to transfer the electrical current from the power supply 103 to the first and second conductive rails 34, 104 or any other desired electrical/mechanical component(s) of the vehicle 22.

FIGS. 2, 17, and 18 illustrate configurations in which there are four connectors 100. Here, two connectors 100 are coupled to power supply 103 positive (+) while two connectors 100 are coupled to power supply 103 ground (−). FIGS. 14A, 14B, 16, 19 and 20 illustrate configurations in which there are two connectors 100. Here, one of the connectors 100 is coupled to power supply 103 positive (+) while the other one of the connectors 100 is coupled to power supply 103 ground (−).

In certain embodiments, the power supply 103 is electrically coupled to the conductive rail 34 for transferring electrical current through the conductive rail 34 and the left or right heating elements 96, 98. More specifically, the power supply 103 is electrically coupled to the first or second conductive rails 34, 104 and even more specifically, the power supply 103 positive (+) is electrically coupled to the first conductive rail 34 and the power supply 103 ground (−) is electrically coupled to the second conductive rail 104. For example, referring to FIGS. 14B and 16, one of the connectors 100 is coupled to the first conductive rail 34 and another one of the connectors 100 is coupled to the second conductive rail 104 for allowing electrical current to flow therethrough. In other words, one of the connectors 100 is coupled to respective first and second conductive rails 34, 104 such that the left and right heating elements 96, 98 are in continuous electrical connection to the first and second conductive rails 34, 104 in a parallel circuit. As such, the left and right heating elements 96, 98 are electrically coupled to the first and second conductive rails 34, 104 and the center heating element 54 of the sliding panel 28 is electrically coupled to the conductive cable 60 independently of the first and second conductive rails 34, 104.

Figure 14A:
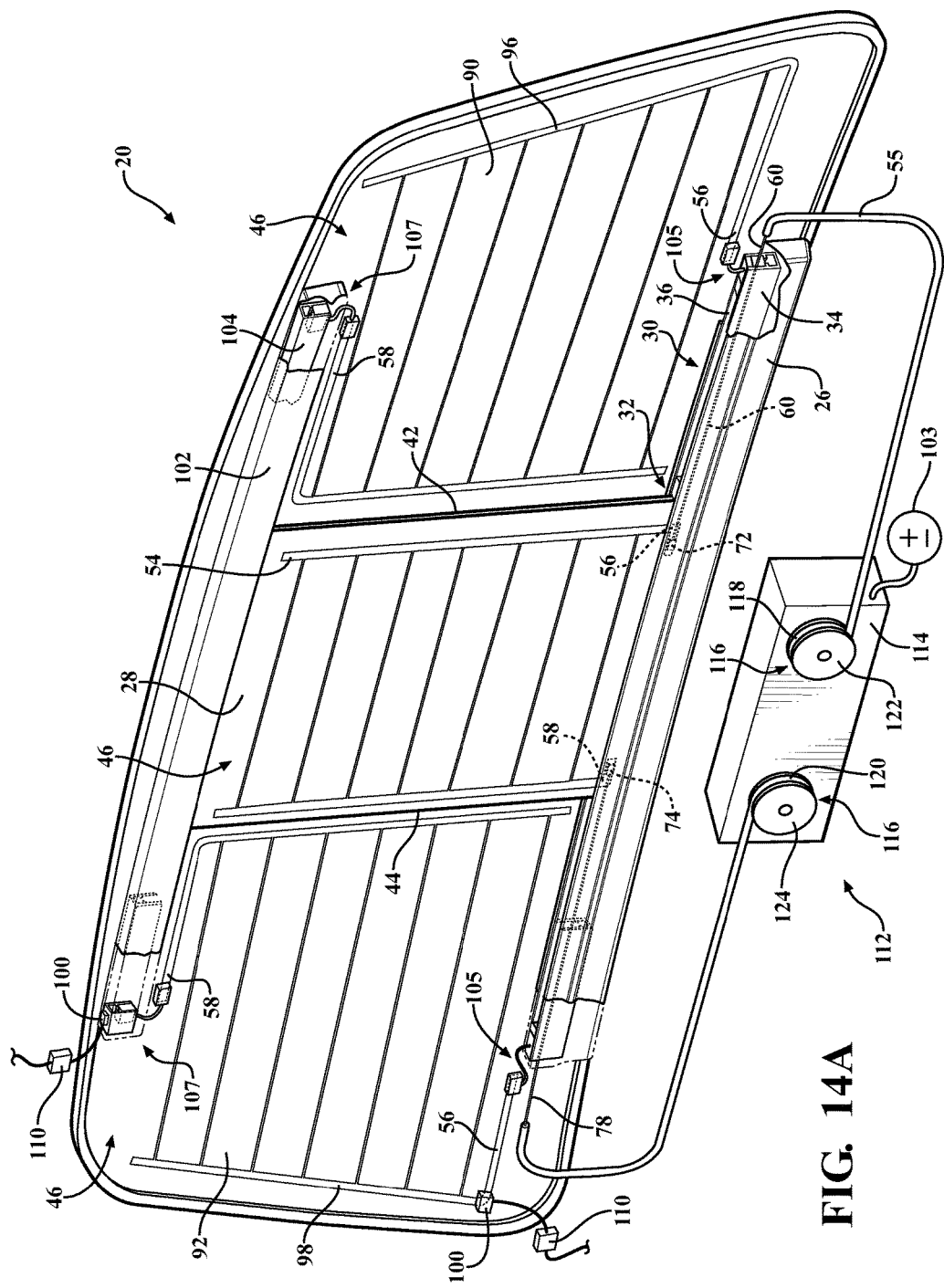
FIG. 14A is a perspective view of an interior of another sliding window assembly having a first fixed panel, a second fixed panel, and a sliding panel disposed therebetween in a closed position with a first conductive rail and a second conductive rail and a cable drive system including a motor having a first spool and a second spool with one connector coupled to the second conductive rail and another connector coupled to the first end of the right heating element.

As another example, referring to FIG. 14A, one of the connectors 100 is coupled to one of the first and second conductive rails 34, 104 and another one of the connectors 100 is coupled to one of the left and right heating elements 96, 98 such that the left and right heating elements 96, 98 are in continuous electrical connection to the first and second conductive rails 34, 104 in the parallel circuit. Specifically, one of the connectors 100 is coupled to one of the first and second conductive rails 34, 104 and another one of the connectors 100 is coupled to one of the first and second ends 56, 58 of one of the left and right heating elements 96, 98. More specifically, FIG. 14A illustrates one of the connectors 100 coupled to the second conductive rail 104 and another one of the connectors 100 coupled to the first end 56 of the right heating element 98. Typically, the power supply 103 provides continuous flow of electrical current through the left and right heating elements 96, 98 of the first and second fixed panels 90, 92 respectively. As such, if the electrical connection is broken in the left heating element 96, the right heating element 98 will continue to operate, and vice versa.

In one embodiment, as shown in FIG. 16, the heating element 54 of the sliding panel 28 can also be electrically coupled to the conductive rail 34, and more specifically the first and second conductive rails 34, 104 as disclosed in U.S. patent application Ser. No. 12/944,448, the disclosure of which is incorporated by reference in its entirety. Typically, a second upper connector 106 and a second lower connector 108 are each coupled to the heating element 54 of the sliding panel 28 and continuously engage the first and second conductive rails 34 respectively during movement of the sliding panel 28 such that the heating element 54 of the sliding panel 28 remains electrically coupled to the first and second conductive rails 34. The second lower connector 108 is coupled to one of the first and second ends 56, 58 of the heating element 54 and the second upper connector 106 is coupled to a third end 111 of the sliding panel. It is to be appreciated that the first, second, and third ends 56, 58, 111 of the heating element 54 of the sliding panel 28 can be at any suitable location. It is to further be appreciated that the second upper and lower connectors 106, 108 can be coupled to the heating element 54 of the sliding panel 28 at any suitable location. Typically, the second upper and lower connectors 106, 108 are coupled to the heating element 54 of the sliding panel 28 by soldering. It is to be appreciated that the second upper and lower connectors 106, 108 can be coupled to the first, second, or third ends 56, 58, 111 of the heating element 54 of the sliding panel 28 by welding, adhesive, or any other suitable method. It is to also be appreciated that the second upper and lower connectors 106, 108 can be coupled to the first and second conductive rails 34, 104 respectively such that the sliding panel 28 moves back and forth relative to the connectors 106, 108 and is further disclosed in U.S. patent application Ser. No. 12/944, 448, It is to further be appreciated that the first and second conductive rails 34, 104 as disclosed in U.S. patent application Ser. No. 12/944,448 and the conductive cable 60 coupled with the terminal ends 72, 74 as disclosed herein, can be utilized together as shown in FIG. 16 thereby providing a back-up mechanism for the heating element 54 of the sliding panel 28.

Referring to FIGS. 2, 14A, 14B, 16-20, a wire harness 110 may be utilized to electrically connect the left and right heating elements 96, 98 of the first and second fixed panels 90, 92 to the power supply 103. Further, the wire harness 110 may be utilized to electrically connect the first and second conductive rails 34, 104 to the power supply 103. In one example, as shown in FIGS. 2, 17, and 18, the wire harness 110 is coupled to the connectors 100 coupled to one of the left and right heating elements 96, 98. More specifically, FIGS. 2, 17, and 18 illustrate one wire harness 110 coupled to the connectors 100 coupled to the left heating element 96 and another wire harness 110 coupled to the connectors 100 coupled to the right heating element 98. As such, the center, left, and right heating elements 54, 96, 98 are electrically coupled to the power supply 103 independently of each other. In other words, electrical current flows through the left heating element 96 through the connectors 100 and one wire harness 110 and electrical current flows through the right heating element 98 through other connectors 100 and another wire harness 110 and additionally, electrical current flows through the center heating element 54 utilizing the conductive cable 60 electrically coupled to a motor assembly 114 as discussed further below.

Figure 14B:
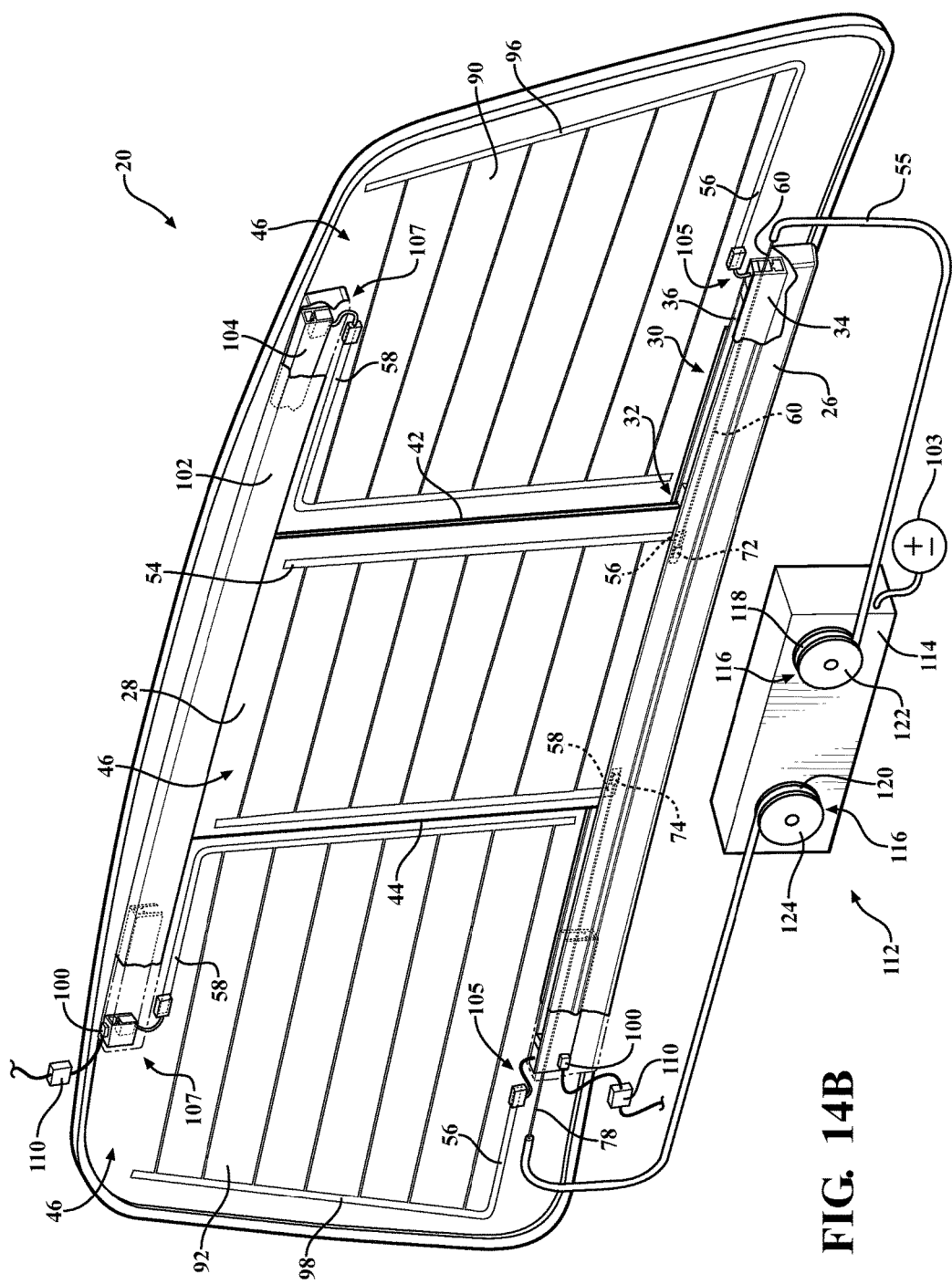
FIG. 14B is a perspective view of the interior of the sliding window assembly with the first and second conductive rails and the cable drive system having the first and second spools with one connector coupled to the first conductive rail and another connector coupled to the second conductive rail.
Figure 15:
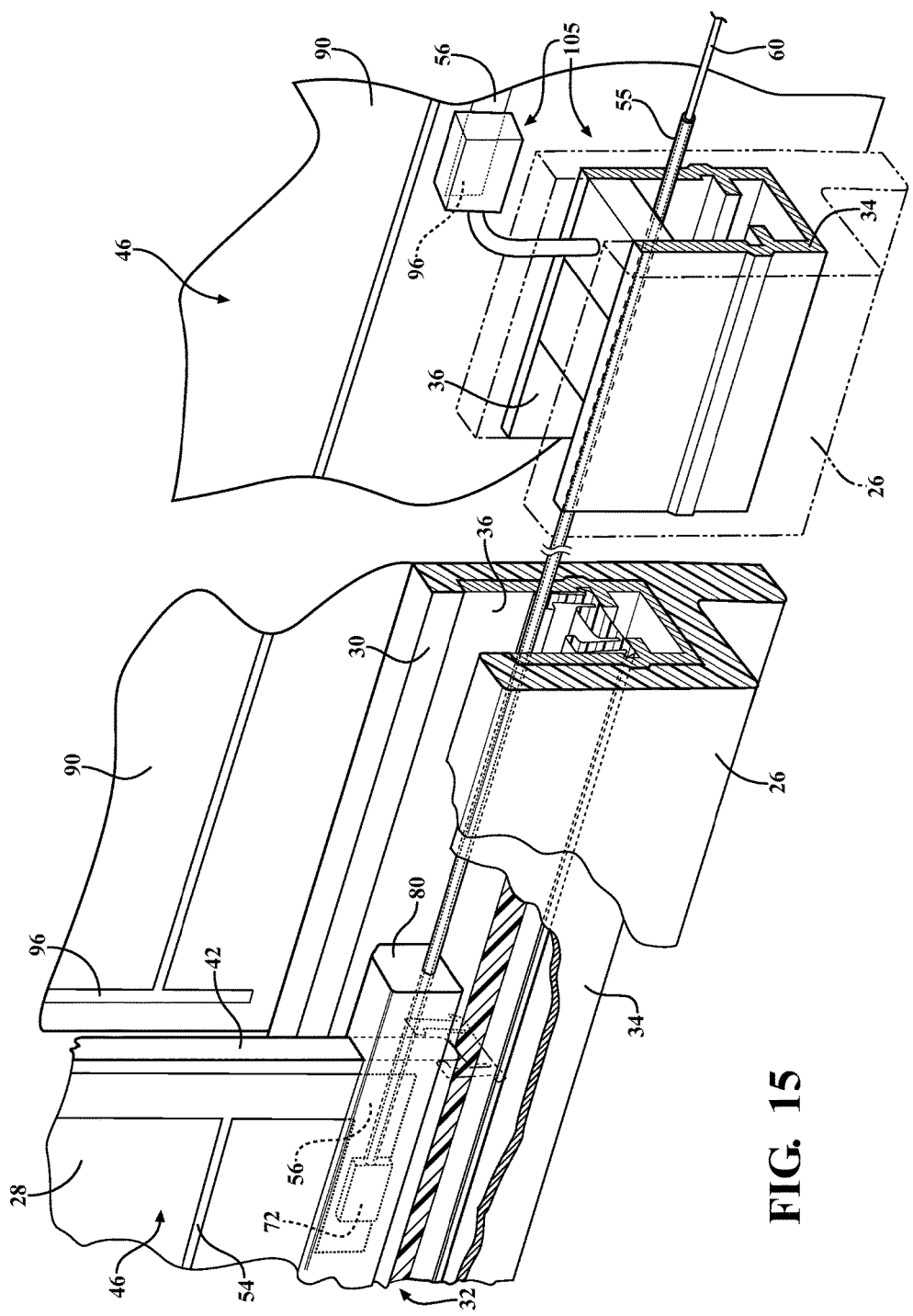
FIG. 15 is a perspective broken view of the conductive cable coupled to the sliding panel with connectors coupled to the first conductive rail and the first fixed panel.

In another example, as shown in FIGS. 14B and 16, the wire harness 110 is coupled to the connectors 100 coupled to the first and second conductive rails 34, 104. In FIG. 14B, electrical current flows through the left, and right heating elements 96, 98 utilizing the first and second conductive rails 34, 104. Therefore, the left and right heating elements 96, 98 are in continuous electrical connection to the first and second conductive rails 34, 104 in the parallel circuit such that electrical current flows through the left and right heating elements 96, 98 independently of each other and independent of the left and right heating elements 96, 98, electrical current flows through the center heating element 54 utilizing the conductive cable 60 electrically coupled to the motor assembly 114. As mentioned above, FIG. 16 illustrates the back-up mechanism for the center heating element 54, therefore, the center, left, and right heating elements 54, 96, 98 are in continuous electrical connection to the first and second conductive rails 34, 104 in the parallel circuit such that electrical current flows through the center, left, and right heating elements 54, 96, 98 independently of each other and additionally, electrical current flows through the center heating element 54 utilizing the conductive cable 60 electrically coupled to the motor assembly 114.

In yet another example, as shown in FIG. 14A, the wire harness 110 is coupled to the connector 100 coupled to one of the left and right heating elements 96, 98 and the connector 100 coupled to one of the first and second conductive rails 34, 104. More specifically, FIG. 14A illustrates the wire harness 110 coupled to the connector 100 coupled to the right heating element 98 and the connector 100 coupled to the second conductive rail 104. As such, electrical current flows through the right heating element 98 and the left heating element 96 utilizing the first and second conductive rails 34, 104 and independent of the first and second conductive rails 34, 104, electrical current flows through the center heating element 54 utilizing the conductive cable 60 electrically coupled to the motor assembly 114. In other words, electrical current flows through the right heating element 98, through one of the first and second conductive rails 34, 104, through the left heating element 96, through the other one of the first and second conductive rails 34, 104 and out to the power supply 103 and independently, electrical current flows through the center heating element 54 utilizing the conductive cable 60 electrically coupled to the motor assembly 114. It is to be appreciated for FIG. 14A, one of the connectors 100 can be coupled to the left heating element 96 instead of the right heating element 98.

It is to be appreciated that the wire harness 110 can be coupled to the connectors 100 in any suitable location. It is to further be appreciated that any suitable mechanism can be utilized to transfer electrical current through the first and second conductive rails 34, 104 and the left and right heating elements 96, 98. It is to also be appreciated that electrical current can flow through the entire first and second conductive rails 34, 104 or electrical current can flow through a portion of the first and second conductive rails 34, 104.

Figure 19:
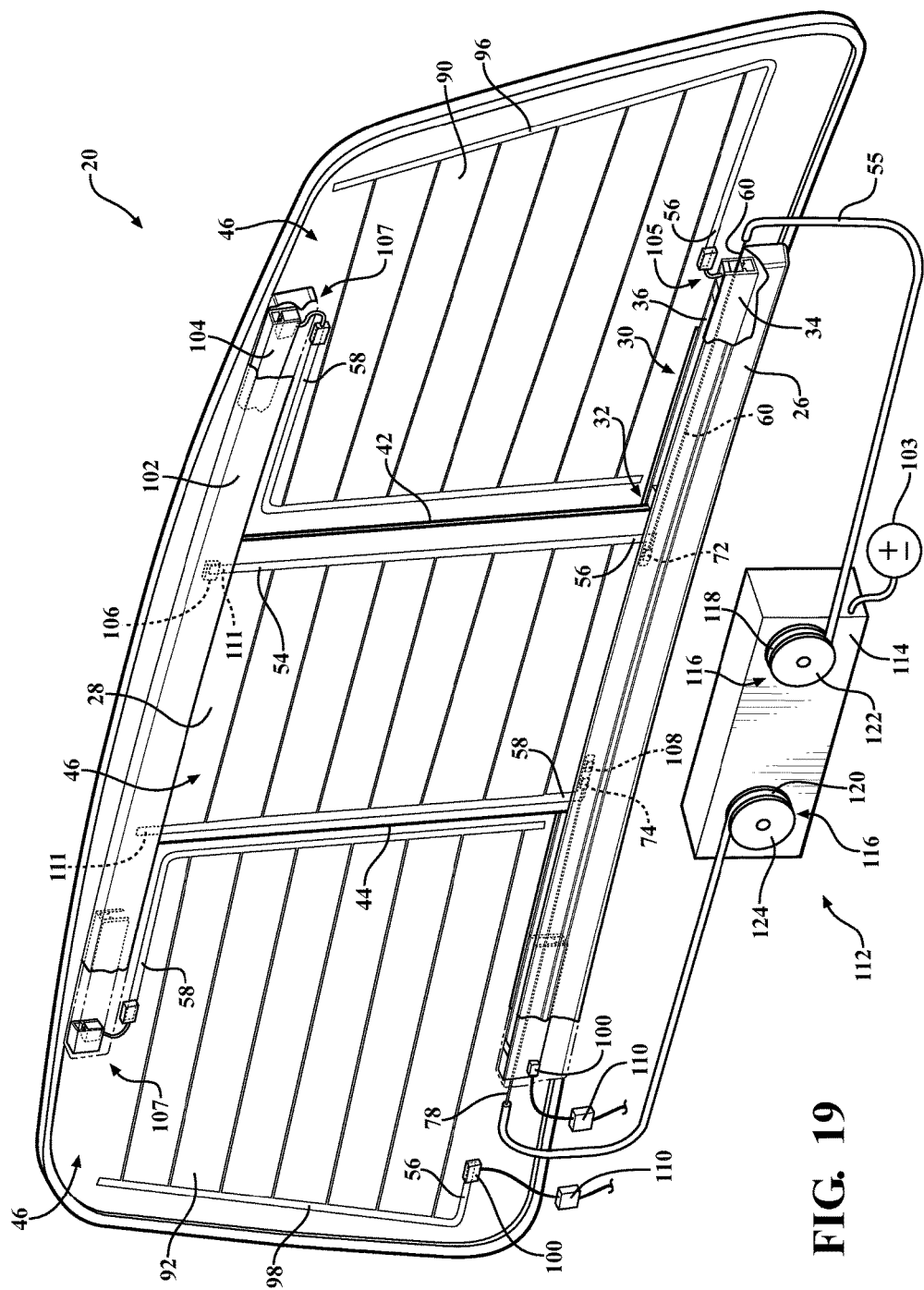
FIG. 19 is a perspective view of an interior of another sliding window assembly and a cable drive system with a left heating element and a right heating element electrically connected in a series circuit.
Figure 20:
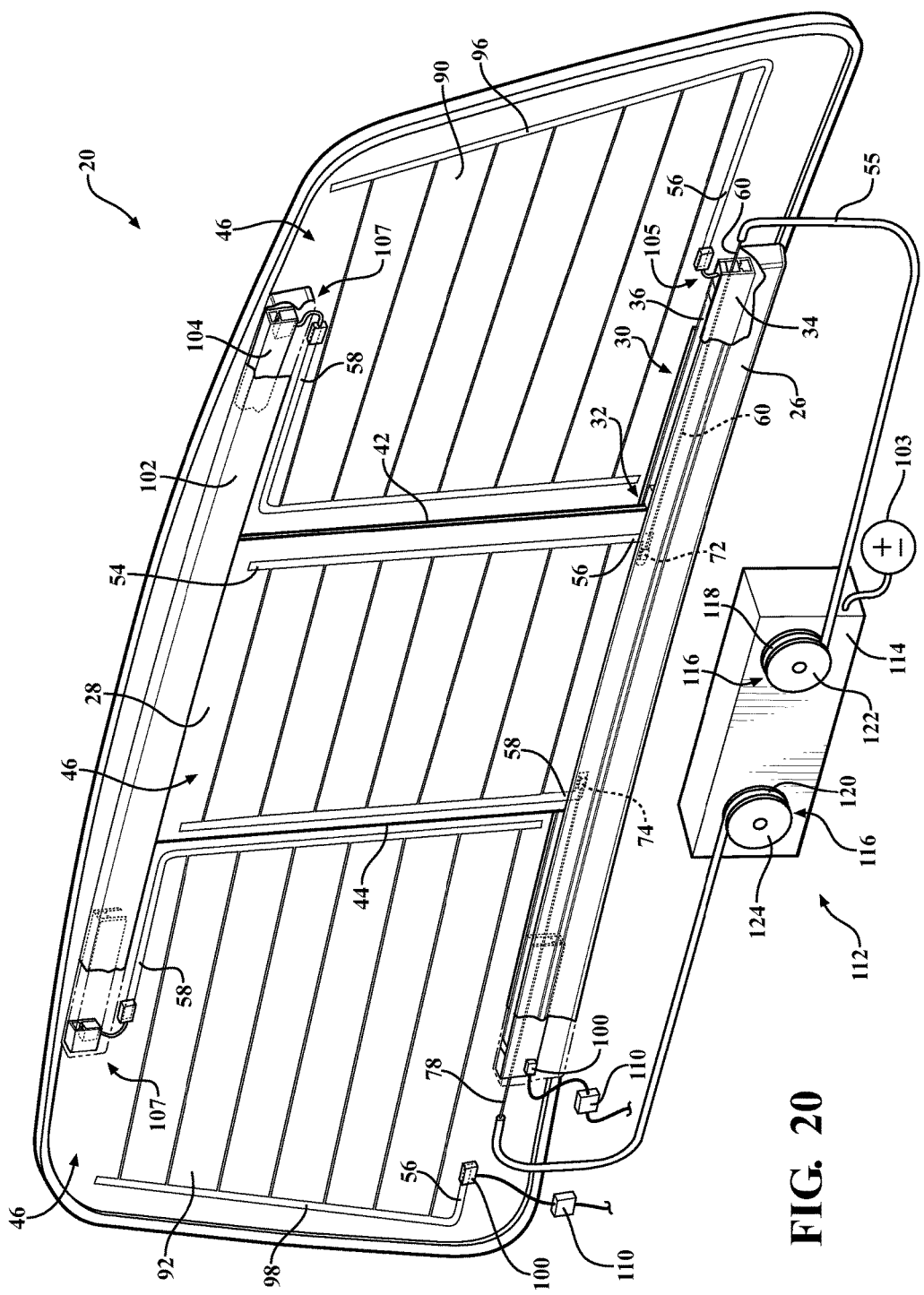
FIG. 20 is a perspective view of an interior of yet another sliding window assembly and the cable drive system with the left and right heating elements electrically connected in a series circuit.
Figure 21:
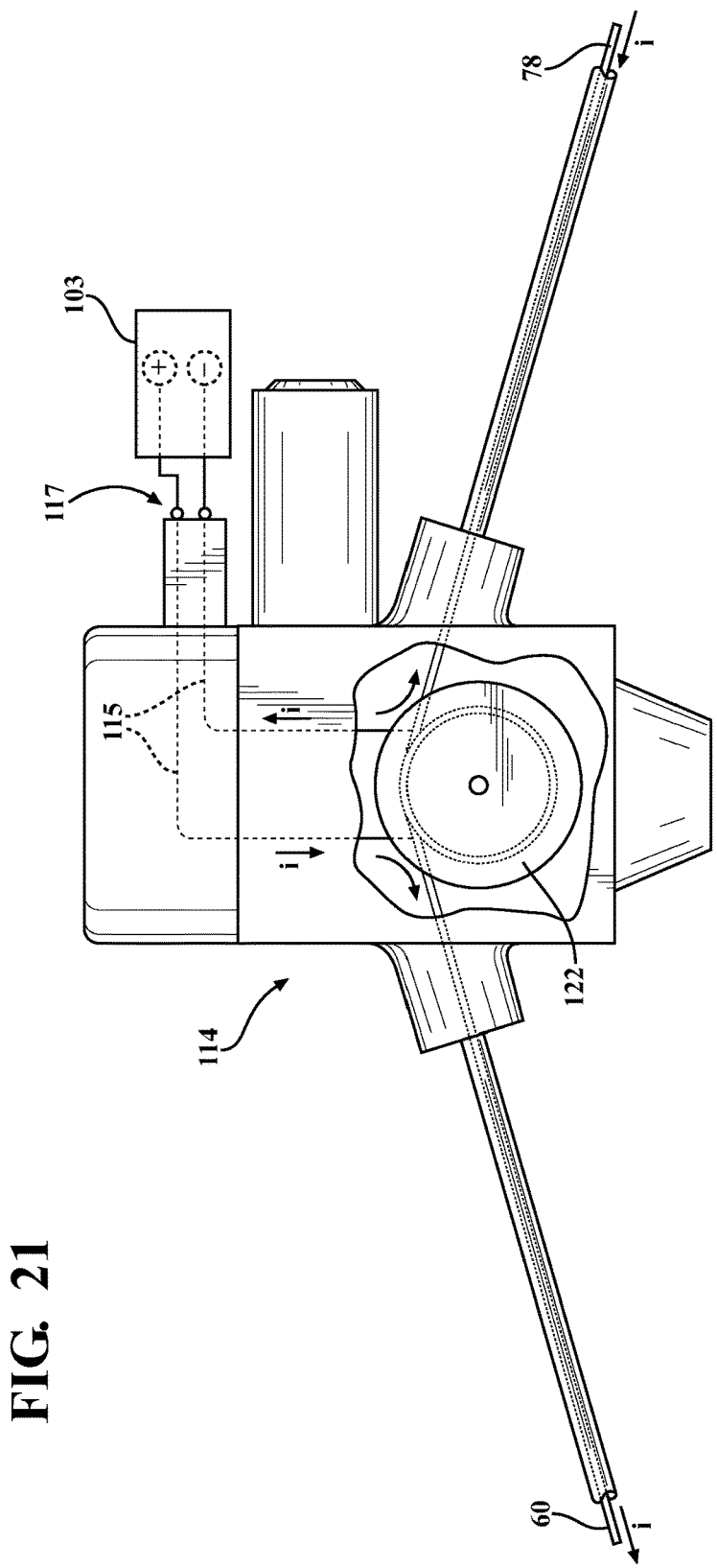
FIG. 21 is a side view, partially in phantom, of the motor assembly mechanically and electrically coupled to first and second conductive cables according to one embodiment.

In certain embodiments, as shown in FIGS. 19 and 20, the left and right heating elements 96, 98 are in continuous electrical connection to the conductive rail 34 in a series circuit. More specifically, the left and right heating elements 96, 98 are in continuous electrical connection to the first and second conductive rails 34, 104 in the series circuit. As such, electrical current flows through one of the left and right heating elements 96, 98, through one of the first and second conductive rails 34, 104, through the other one of the left and right heating elements 96, 98, through the other one of the first and second conductive rails 34, 104 and out to the power supply 103.

FIGS. 19 and 20 illustrate one of the connectors 100 coupled to one of the first and second conductive rails 34, 104 and another one of the connectors 100 coupled to one of the left and right heating elements 96, 98 such that the left and right heating elements 96, 98 are in continuous electrical connection in the series circuit. More specifically, FIGS. 19 and 20 illustrate one connector 100 coupled to the first end 56 of the right heating element 98 and another connector 100 coupled to the first conductive rail 34. For the embodiment of FIGS. 19 and 20, one of the first lower and upper connectors 105, 107 can be eliminated. For example, one of the first lower connectors 105 has been eliminated such that electrical current flows through the left and right heating elements 96, 98 in the series circuit.

Further, FIG. 19 illustrates utilizing the second upper and lower connectors 106, 108 electrically coupled to the first and second conductive rails 34, 104. Hence, the center heating element 54 is in the parallel circuit with the left heating element 96 and the center heating element 54 is in the series circuit with the right heating element 98. In addition, FIG. 19 illustrates the back-up mechanism of energizing the center heating element 54 in two different ways. As such, electrical current can also flow through the center heating element 54 independently of the left and right heating elements 96, 98 utilizing the conductive cable 60 electrically coupled to the motor assembly 114. It is to be appreciated that for any of these embodiments/alternatives, the back-up mechanism is optional. Additionally, FIG. 20 illustrates that electrical current can also flow through the center heating element 54 independently of the left and right heating elements 96, 98 utilizing the conductive cable 60 electrically coupled to the motor assembly 114 without utilizing the back-up mechanism.

Referring to FIGS. 2, 14A, 14B, 16-24, a cable drive system 112 for the sliding panel 28 having the heating element 54 is generally shown. The cable drive system 112 includes the conductive cable 60 mechanically moving the sliding panel 28 and for electrically connecting to the heating element 54 via the first and second terminals 72, 74, as discussed above. The conductive cable 60 is movable between a first position and a second position corresponding to the movement of the sliding panel 28. In other words, when the conductive cable 60 moves to the first position, the sliding panel 28 moves to the open position and when the conductive cable 60 moves to the second position, the sliding panel 28 moves to the closed position. It is to be appreciated that any of the conductive rail 34, 104 embodiments/alternatives as disclosed in U.S. patent application Ser. No. 12/944,448 can be utilized with the cable drive system 112 and the sliding window assembly 20 of the subject invention.

The cable drive system 112 includes the motor assembly 114 electrically coupled to the power supply 103 of the vehicle 22. The power supply 103 also provides electrical current to the motor assembly 114 for allowing the motor assembly 114 to move the sliding panel 28 while also providing electrical current to the conductive cable 60. The conductive cable 60 is mechanically and electrically coupled to the motor assembly 114. The power supply 103 provides electrical current to the conductive cable 60 through the motor assembly 114. The power supply 103 also provides electrical current to the left and right heating elements 96, 98 and the first and second conductive rails 34, 104. As mentioned above, it is to be appreciated that any suitable switches, relays, etc. can be utilized to transfer the electrical current from the power supply 103 to the motor assembly 114 and first and second conductive rails 34, 104 or any other desired electrical/mechanical component(s) of the vehicle 22. It is to be appreciated that a plurality of power supplies can be utilized to provide electrical current to any desired electrical/mechanical component(s) of the vehicle 22.

The first and second terminal ends 72, 74 are movable concurrently with the conductive cable 60 between the first and second positions. As discussed above, the first terminal end 72 is coupled to the first end 56 of the heating element 54 and the second terminal end 74 is coupled to the second end 58 of the heating element 54 for electrically connecting the heating element 54 to the conductive cable 60. Hence, the heating element 54 of the sliding panel 28 remains electrically coupled to the conductive cable 60 in both the open and closed positions.

The conductive cable 60 includes a proximal end portion 116 mechanically and electrically coupled to the motor assembly 114. In certain embodiments, the proximal end portion 116 further includes a first proximal end 118 and a second proximal end 120 with the first conductive cable 60 having the first proximal end 118 and the second conductive cable 78 having the second proximal end 120 such that each of the first and second proximal ends 118, 120 are mechanically coupled to and electrically coupled to the motor assembly 114. The first proximal end 118 and second proximal end 120 remain mechanically and electrically coupled to the motor assembly 114 throughout movement of the sliding panel 28 and energizing of the heating element 54. The first proximal end 118 and second proximal end 120 may be electrically coupled to the motor assembly 114 using any suitable method, such as by soldering, electrical connectors, and the like. The first proximal end 118 and second proximal end 120 may be mechanically coupled to the motor assembly 114 using any suitable method, such as by fasteners, mechanical connectors, and the like.

As shown in FIGS. 2, 14A, 14B, 16, 19, 20, and 24, in one alternative, the motor assembly 114 includes a first spool or drum 122 and a second spool or drum 124 spaced from each other and each movable independent of each other. The first and second drums 122, 124 move the first and second conductive cables 60, 78 between the first and second positions and thus moves the sliding panel 28 between the open and closed position. In one embodiment, the first proximal end 118 of the first conductive cable 60 is coupled to the first spool 122 and the second proximal end 120 of the second conductive cable 78 is coupled to the second spool 124.

The first and second spools 122, 124 are electrically isolated from one another because the first and second spools 122, 124 are spaced from one another. Electrical current flows through the first and second spools 122, 124 to energize the heating element 54 of the sliding panel 28. Hence, electrical current flows through the first and second spools 122, 124, the first and second terminal ends 72, 74 and the heating element 54 of the sliding panel 28.

In one embodiment, the power supply 103 positive (+) is electrically coupled to the first spool 122 and the power supply 103 ground (−) is electrically coupled to the second spool 124. In such instances, electrical current passes from the power supply 103 positive (+) to the first spool 122 to the first conductive cable 60 to the first terminal 72 to the heating element 54. After passing through the heating element 54, electrical current passes to the second terminal 74 to the second conductive cable 78 to the second spool 124 and back to power supply 103 ground (−). Of course, the power supply 103 ground (−) may be electrically coupled to the first spool 122 and the power supply 103 positive (+) may be electrically coupled to the second spool 124. In such instances, the path of electrical current is opposite as described above.

In one embodiment, as shown in FIGS. 21-24, electrical wires 115 are coupled between the power supply 103 and the motor assembly 114. The electrical wires 115 may be part of a wiring harness or may stand-alone. In FIGS. 21-24, the motor assembly 114 may include a first contact 117 and a second contact 119 spaced from the first contact 117. The first and second contacts 117, 119 electrically connect the spool 122 to the power supply 103 such electrical current from the power supply 103 is transferred to the spool 122. As such, the first and second contacts 117, 119 may be part of the electrical path when the heating element 54 is energized.

To move the sliding panel 28 to the open position, the first spool 122 rotates in a first direction, which unwinds the first conductive cable 60 on the first spool 122 while the second spool 124 rotates in a second direction opposite the first direction, which winds up the second conductive cable 78 on the second spool 124. As such, the second conductive cable 78 pulls the sliding panel 28 to the open position. Likewise, to move the sliding panel 28 to the closed position, the first spool 122 rotates in the second direction, which winds up the first conductive cable 60 on the first spool 122 and the second spool 124 rotates in the first direction, which unwinds the second conductive cable 78 on the second spool 124. Thus, the first conductive cable 60 pulls the sliding panel 28 to the closed position. The heating element 54 of the sliding panel 28 remains electrically coupled to the first and second terminal ends 72, 74 during rotation of the first and second spools 122, 124 when the sliding panel 28 moves between the open and closed positions. Typically, the first direction is counter-clockwise and the second direction is clockwise. It is to be appreciated that the first direction can be clockwise and the second direction can be counter-clockwise.

The first and second conductive cables 60, 78 can be wrapped around the first and second spools 122, 124, respective in any suitable manner for moving the sliding panel 28 between the open and closed positions. It is to also be appreciated that the first and second spools 122, 124 can rotate in the same direction to wind or unwind the first and second conductive cables 60, 78. Hence, when the first and second spools 122, 124 rotate in the same direction, the manner in which at least one of the first and second conductive cables 60, 78 are wrapped around at least one of the first and second spools 122, 124 changes. The motor assembly 114 configuration discussed above is commonly referred to as a pull-pull cable system as known to those skilled in the art. It is to be appreciated that any suitable motor assembly 114 can be utilized to move the sliding panel 28 between the open and closed positions.

In another alternative, as shown in FIGS. 17, 22, and 23 the motor assembly 114 includes only the first spool 122. In other words, the second spool 124 is eliminated. In this configuration, the first and second conductive cables 60, 78 are coupled to the first spool 122. Likewise, the first and second terminal ends 72, 74 are coupled to the first spool 122 by way of the first and second conductive cables 60, 78, respectively. Typically, in this configuration, the first and second conductive cables 60, 78 are wrapped around the first spool 122 in opposite directions. For example, if the first direction is clockwise, rotation of the first spool 122 in the first direction moves the sliding panel 28 to the open position and if the second direction is counter-clockwise, rotation of the first spool 122 in the second direction moves the sliding panel 28 to the closed position.

In this configuration, the first spool 122 comprises a first portion 138 and a second portion 140 being electrically isolated from the first portion 138 with an electrical isolator 141. The first conductive cable 60 is electrically and mechanically coupled to the first portion 138 and the second conductive cable 78 is electrically and mechanically coupled to the second portion 140. The first conductive cable 60 may be electrically coupled to the first portion 138 through the first contact 117. The second conductive cable 78 may be electrically coupled to the second portion 140 through the second contact 119. The first and second portions 138, 140 may be electrically isolated using any suitable insulation means, such as a dielectric plate disposed therebetween.

Electrical current flows through the first spool 122 to energize the heating element 54 of the sliding panel 28. In one embodiment, the power supply 103 positive (+) is electrically coupled to the first portion 138 and the power supply 103 ground (−) is electrically coupled to the second portion 140. In such instances, electrical current passes from the power supply 103 positive (+) to first contact 117, to the first portion 138, to the first conductive cable 60, to the first terminal 72, to the heating element 54. After passing through the heating element 54, electrical current passes to the second terminal 74, to the second conductive cable 78, to the second portion 140, to the second contact 119 and back to power supply 103 ground (−). Of course, the power supply 103 ground (−) may be electrically coupled to the first portion 138 and the power supply 103 positive (+) may be electrically coupled to the second portion 140. In such instances, the path of electrical current is opposite as described above.

The heating element 54 of the sliding panel 28 remains electrically coupled to the first and second terminal ends 72, 74 during rotation of the first spool 122 when the sliding panel 28 moves between the open and closed positions. In other words, the heating element 54 of the sliding panel 28 remains electrically coupled to the first and second terminal ends 72, 74 during movement of the sliding panel 28 between the open and closed positions. The first and second conductive cables 60, 78 can be wrapped around the first spool 122 in any suitable manner for moving the sliding panel 28 between the open and closed positions.

Typically, the motor assembly 114 is the pull-pull cable system as discussed above. As such, to move the sliding panel 28 to the open position when the first direction is clockwise, the first spool 122 rotates in the first direction, which unwinds the first conductive cable 60 on the first spool 122 while the second conductive cable 78 winds up on the first spool 122. Simply stated, the second conductive cable 78 pulls the sliding panel 28 to the open position. Likewise, to move the sliding panel 28 to the closed position and the second direction is counter-clockwise, the first spool 122 rotates in the second direction which winds up the first conductive cable 60 on the first spool 122 while the second conductive cable 78 unwinds on the first spool 122. Simply stated, the first conductive cable 60 pulls the sliding panel 28 to the closed position. It is to be appreciated that the first direction can be counter-clockwise and the second direction can be clockwise. The above-described configuration is possible in the embodiment wherein the first spool 122 includes the first and second portions 138, 140.

In yet another alternative, as shown in FIG. 18, the motor 114 again includes only the first spool 122 with the conductive cable 60 coupled to the first spool 122. In other words, the second spool 124 is eliminated. In this configuration, the conductive cable 60 appears to be one piece. The conductive cable 60 is only wrapped around a portion of the first spool 122 such that the conductive cable 60 is coupled to the first spool 122 by a friction fit. Further, the conductive cable 60 is under tension for this configuration. As such, rotation of the first spool 122 causes the conductive cable 60 to move back and forth along a portion of the first spool 122 instead of completely wrapping around the first spool 122. Despite moving back and forth along the portion of the first spool 112, the conductive cable 60 remains electrically coupled to the first spool 122 and the power supply 103.

It is to be appreciated for any of the embodiments/alternatives discussed above, guides can be used for positioning and guiding the first and second conductive cables 60, 78 and the first and second terminal ends 72, 74 between the motor assembly 114 and the sliding panel 28. For illustrative purposes only, some of the details of at least FIGS. 2, 14A, 14B, 15-24 are not shown for illustrating other components of the subject invention.

Many modifications and variations of the subject invention are possible in light of the above teachings. The foregoing invention has been described in accordance with the relevant legal standards; thus, the description is exemplary rather than limiting in nature. Variations and modifications to the disclosed embodiment can become apparent to those skilled in the art and do come within the scope of the invention.

What is claimed is:

1. A sliding window assembly for a vehicle, said assembly comprising:
a track adapted to be coupled to the vehicle;
a sliding panel movable relative to said track between an open position and a closed position;
a heating element coupled to said sliding panel for heating said sliding panel; and
a conductive cable coupled to said sliding panel and said heating element, wherein said conductive cable is configured to transfer electrical current to energize said heating element and to undergo mechanical force to move said sliding panel relative to said track between said open and closed positions.

2. The sliding window assembly of claim 1 further comprising a conduit having an interior surface surrounding said conductive cable and an exterior surface being exposed, with said conductive cable being the sole component within said conduit configured to transfer electrical current to energize said heating element or to undergo mechanical force to move said sliding panel relative to said track between said open and closed positions.

3. The sliding window assembly of claim 1 further comprising a bracket mechanically coupled to said sliding panel wherein said conductive cable is mechanically coupled to said bracket and wherein said conductive cable is configured to move said sliding panel by applying mechanical force to said bracket.

4. The sliding window assembly of claim 1 wherein said conductive cable is configured to undergo compression or tension to move said sliding panel between said open and closed positions.

5. The sliding window assembly of claim 1 further comprising a motor assembly with said conductive cable mechanically and electrically coupled to said motor assembly and with said motor assembly configured to mechanically move said conductive cable to move said sliding panel and to provide electrical current to said conductive cable to energize said heating element.

6. The sliding window assembly of claim 5 wherein said motor assembly comprises a spool configured to rotate in a first direction to mechanically wind said conductive cable and in a second direction to mechanically unwind said conductive cable for moving said sliding panel.

7. The sliding window assembly of claim 6 wherein said conductive cable is electrically coupled to said spool and further comprising a power supply electrically coupled to said spool and configured to transfer electrical current to said conductive cable through said spool.

8. The sliding window assembly of claim 7 wherein said spool mechanically connects to said sliding panel through said conductive cable and wherein said spool electrically connects to said heating element through said conductive cable.

9. The sliding window assembly of claim 8 wherein said conductive cable is further defined as a first conductive cable and further comprising a second conductive cable mechanically and electrically coupled to said motor assembly and with said first conductive cable configured to transfer electrical current from said motor assembly to said heating element to energize said heating element and with said second conductive cable configured to transfer electrical current from said heating element to said motor assembly after electrical current passes through said heating element.

10. The sliding window assembly of claim 9 wherein said spool comprises a first portion and a second portion being electrically isolated from said first portion and with said first conductive cable being electrically and mechanically coupled to said first portion and with said second conductive cable being electrically and mechanically coupled to said second portion.

11. The sliding window assembly of claim 9 wherein said spool is further defined as a first spool and wherein said motor assembly further comprises a second spool spaced from said first spool with said first conductive cable electrically and mechanically coupled to said first spool and with said second conductive cable being electrically and mechanically coupled to said second spool.

12. The sliding window assembly of claim 11 wherein said first conductive cable configured to transfer electrical current from said first spool to said heating element to energize said heating element and with said second conductive cable configured to transfer electrical current from said heating element to said second spool after electrical current passes through said heating element.

13. The sliding window assembly of claim 1 wherein said conductive cable comprises a plurality of strands.

14. The sliding window assembly of claim 1 further including a first fixed panel and a second fixed panel spaced from each other to define an opening therebetween with said sliding panel movable relative to said first and second fixed panels between said open position uncovering said opening and said closed position covering said opening.

15. A cable drive system for a sliding panel of a vehicle, the sliding panel having a heating element for heating the sliding panel, said system comprising:
a motor assembly; and
a conductive cable electrically and mechanically coupled to said motor assembly;
wherein said motor assembly is configured to provide electrical current to said conductive cable to energize the heating element for heating the sliding panel and to apply mechanical force to said conductive cable for moving the sliding panel between an open position and a closed position.

16. The cable drive system of claim 15 further comprising a conduit having an interior surface surrounding said conductive cable and an exterior surface being exposed, with said conductive cable being the sole component within said conduit to receive electrical current or mechanical force from said motor assembly.

17. The cable drive system of claim 15 wherein said conductive cable is configured to undergo compression or tension to move the sliding panel between said open and closed positions.

18. The cable drive system of claim 15 wherein said motor assembly comprises a spool configured to rotate in a first direction to mechanically wind said conductive cable and in a second direction to mechanically unwind said conductive cable for moving the sliding panel.

19. The cable drive system of claim 18 wherein said conductive cable is electrically coupled to said spool and further comprising a power supply electrically coupled to said spool and configured to transfer electrical current to said conductive cable through said spool.

20. The cable drive system of claim 18 wherein said spool mechanically connects to the sliding panel through said conductive cable and wherein said spool electrically connects to said heating element through said conductive cable.

21. The cable drive system of claim 20 wherein said conductive cable is further defined as a first conductive cable and further comprising a second conductive cable mechanically and electrically coupled to said motor assembly and with said motor assembly configured to provide electrical current to said first conductive cable to energize the heating element and to receive electrical current from said second conductive cable after electrical current passes through the heating element.

22. The cable drive system of claim 21 wherein said spool comprises a first portion and a second portion being electrically isolated from said first portion and with said first conductive cable being electrically and mechanically coupled to said first portion and with said second conductive cable being electrically and mechanically coupled to said second portion.

23. The cable drive system of claim 21 wherein said spool is further defined as a first spool and wherein said motor assembly further comprises a second spool spaced from said first spool and with said first conductive cable being electrically and mechanically coupled to said first spool and with said second conductive cable being electrically and mechanically coupled to said second spool.

24. A method of operating a sliding window assembly of a vehicle, the sliding window assembly including a track adapted to be coupled to the vehicle, a sliding panel movable relative to the track between an open position and a closed position, a heating element coupled to the sliding panel for heating the sliding panel, and a conductive cable mechanically coupled to the sliding panel and electrically coupled to the heating element, said method comprising:
    transferring electrical current through the conductive cable to energize the heating element for heating the sliding panel; and
    applying mechanical force to the conductive cable to move the sliding panel between the open and closed positions.

* * * * *